(12) United States Patent
Takata

(10) Patent No.: US 8,262,276 B2
(45) Date of Patent: Sep. 11, 2012

(54) CHASSIS ASSEMBLY, ILLUMINATION DEVICE, DISPLAY DEVICE, AND TELEVISION RECEIVER APPARATUS

(75) Inventor: Yoshiki Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/853,470

(22) Filed: Aug. 10, 2010

(65) Prior Publication Data
US 2010/0321594 A1 Dec. 23, 2010

Related U.S. Application Data

(63) Continuation of application No. 12/864,051, filed on Jul. 22, 2010, and a continuation of application No. PCT/JP2009/050866, filed on Jan. 21, 2009.

(30) Foreign Application Priority Data

Feb. 18, 2008 (JP) .................................. 2008-036602

(51) Int. Cl.
*H04N 5/64* (2006.01)
(52) U.S. Cl. ................... 362/632; 362/634; 362/97.1
(58) Field of Classification Search .......... 362/632–634, 362/97.1–97.2
See application file for complete search history.

(56) References Cited

U.S. PATENT DOCUMENTS

| | | | |
|---|---|---|---|
| 7,461,958 B2 * | 12/2008 | Takata et al. ................. | 362/433 |
| 7,527,420 B2 * | 5/2009 | Kim ................................ | 362/634 |
| 7,658,534 B2 * | 2/2010 | Azuma et al. .................. | 362/634 |
| 7,817,224 B2 * | 10/2010 | Sudo ............................... | 349/70 |
| 7,883,260 B2 * | 2/2011 | Kim ................................ | 362/634 |
| 7,909,498 B2 * | 3/2011 | Azuma et al. .................. | 362/634 |
| 2010/0321927 A1* | 12/2010 | Yoshikawa .................... | 362/97.2 |
| 2011/0025928 A1* | 2/2011 | Yokota .......................... | 348/739 |
| 2011/0037789 A1* | 2/2011 | Hisakawa ..................... | 345/690 |

OTHER PUBLICATIONS

Takata; Chassis Assembly, Illumination Device, Display Device, and Television Receiver Apparatus; U.S. Appl. No. 12/864,051, filed Jul. 22, 2010.

* cited by examiner

*Primary Examiner* — Anabel Ton
(74) *Attorney, Agent, or Firm* — Keating & Bennett, LLP

(57) ABSTRACT

A chassis assembly comprises a chassis 14 and lamp clips 18. The chassis 14 has mounting holes 33 to 35. Each lamp clip 18 includes a main body 27 to be mounted to the chassis 14, a lamp gripping portions 28 provided on the main body 27 so as to grip cold cathode tubes 17, and mounting portions 30 to 32 protruding from the main body 27 toward the chassis 14 side. The mounting portions 30 to 32 are to be inserted in the respective mounting holes 33 to 25. Rims of the mounting holes 33 to 35 are sandwiched between the main body 27 and the respective mounting portions 30 to 32. Three mounting portions 30 to 32 and three mounting holes 33 to 35 are provided in relative positions so as to restrict mounting of the lamp clip 18 to the chassis 14 in an orientation other than a predefined orientation.

19 Claims, 25 Drawing Sheets

FIG.1
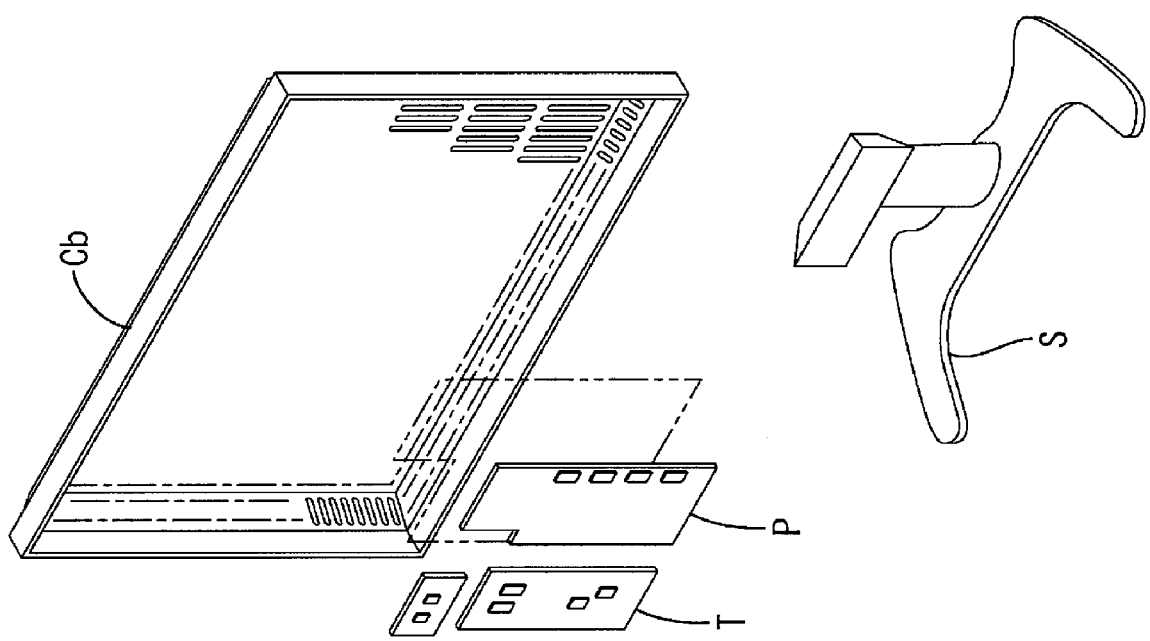
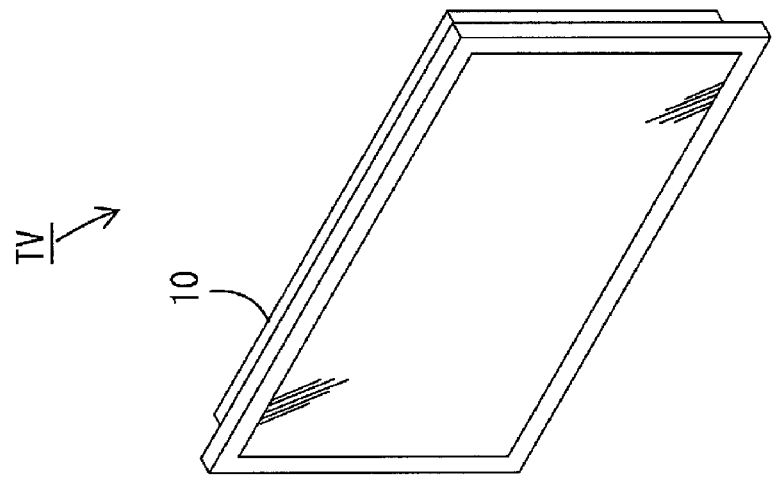
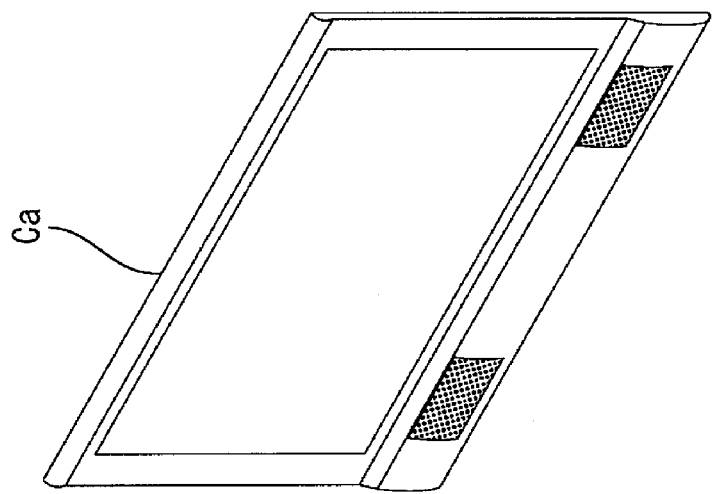

CHASSIS ASSEMBLY, ILLUMINATION DEVICE, DISPLAY DEVICE, AND TELEVISION RECEIVER APPARATUS

TECHNICAL FIELD

The present invention relates to a chassis assembly, an illumination device, a display device, and a television receiver apparatus.

BACKGROUND ART

For example, since a liquid crystal panel used in a liquid crystal display device such as a liquid crystal television is not self-luminous, such a liquid crystal panel separately requires a backlight unit as an illumination device. Such a backlight unit is intended to be installed on a rear side (the side opposite to a display surface) of a liquid crystal panel, and includes: a metallic or resin chassis having an opened face on the liquid crystal panel-side; a large number of fluorescent tubes (for example, cold cathode tubes) housed as lamps in the chassis; a large number of optical members (for example, diffusing sheets) arranged at the opening of the chassis for efficiently emitting light generated by the cold cathode tubes to the liquid crystal panel-side; and a lamp clip for supporting center portions of the elongated and tubular cold cathode tubes. A known example of lamp clips of this type is described in Patent Document 1 below.

Patent Document 1: Japanese Patent Laid-Open No. 2007-173250

Problems to be Solved by the Invention

Depending on how a backlight unit is designed, there may be cases where a problem occurs unless each lamp clip is mounted to the chassis in a particular orientation. However, the fact that conventional lamp clips do not take such cases into account makes providing appropriate responses difficult, for example having to resort to implementing a measure with intrinsic uncertainty such as simply providing thorough instructions to workers responsible for carrying out mounting operations.

DISCLOSURE OF THE INVENTION

The present invention has been made based on the circumstances such as described above, and an object thereof is to reduce an improper mounting that is different from how a lamp holder is supposed to be mounted.

Means for Solving the Problems

A chassis assembly according to the present invention includes a chassis and a lamp holder. The chassis has at least three mounting holes. The lamp holder includes a main body, a lamp gripping portion and at least three mounting portions. The main body is to be mounted to the chassis. The lamp gripping portion for gripping a lamp is provided on the main body. Each of the mounting portions protrudes from the main body so as to extend toward the chassis side to be inserted in the corresponding mounting hole such that a rim of each mounting hole is sandwiched between the corresponding mounting portion and the main body. The mounting portions and the mounting holes are arranged in relative positions so as to restrict mounting of the lamp holder to the chassis in an orientation other than a predefined orientation.

During mounting of the lamp holder to the chassis, if the lamp holder is in a predefined orientation, the mounting portions are inserted in the respective mounting holes. The rims of the mounting holes are sandwiched between the main body and the respective mounting portions, and the lamp holder is mounted to the chassis. Because the mounting portions and the mounting holes are arranged in the relative positions, the lamp holder is less likely to be mounted in an orientation other than the predefined orientation.

BRIEF DESCRIPTION OF THE DRAWINGS

FIG. 1 is an exploded perspective view illustrating a general structure of a television receiver apparatus according to a first embodiment of the present invention;

BEST MODE FOR CARRYING OUT THE INVENTION

First Embodiment

A first embodiment of the present invention will be described with reference to FIGS. 1 to 14.

Figure 2:
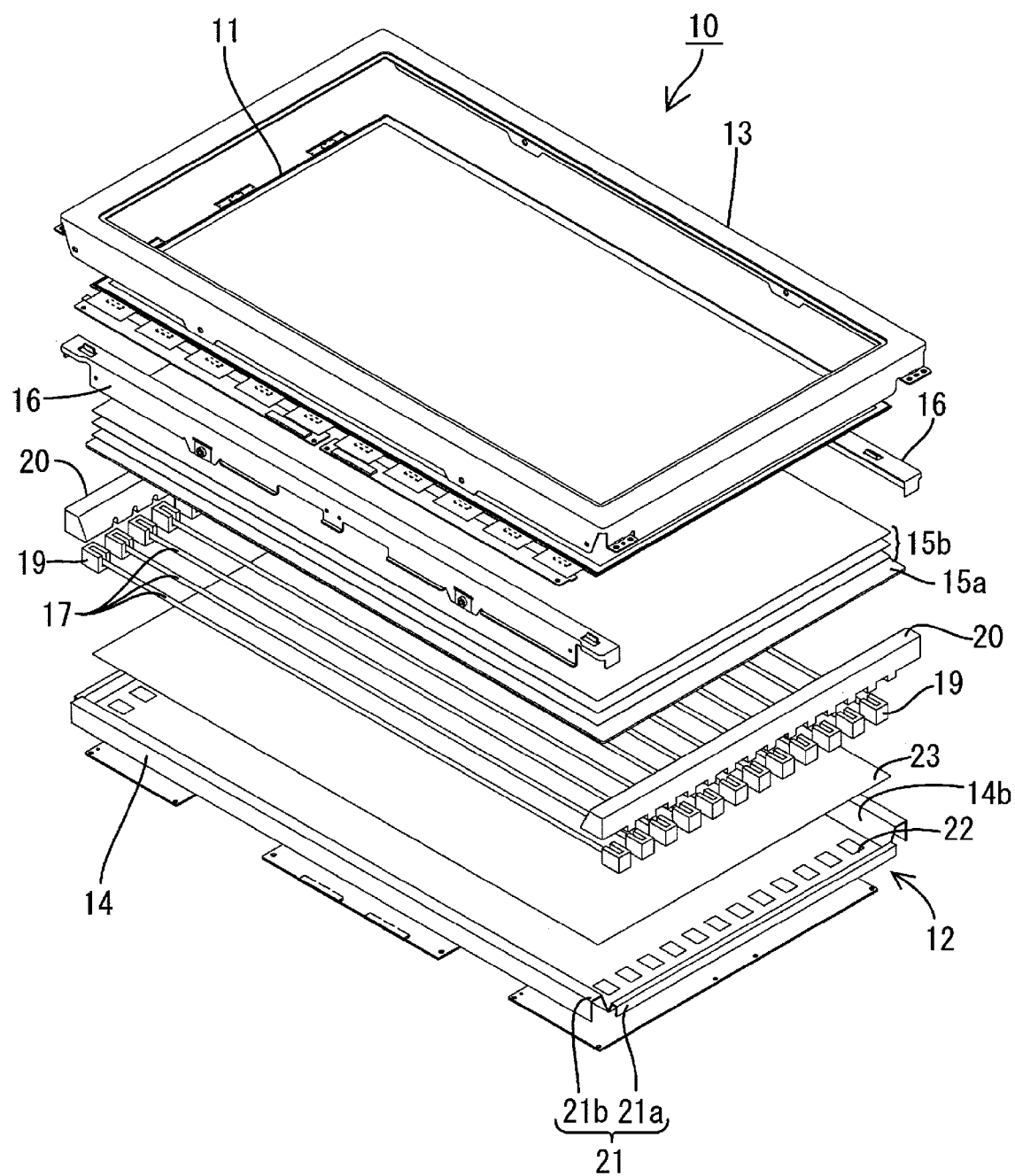
FIG. 2 is an exploded perspective view illustrating a general structure of a liquid crystal display device.

As illustrated in FIG. 1, a television receiver apparatus TV according to the present embodiment includes: a liquid crystal display device 10; both front and rear cabinets Ca and Cb which house the liquid crystal display device 10 so as to sandwich the same; a power source P; a tuner T; and a stand S. The liquid crystal display device (display device) 10 as a whole forms a horizontally long rectangle and is housed in an upright state. As illustrated in FIG. 2, the liquid crystal display device 10 includes a liquid crystal panel 11 that is a display panel and a backlight unit (illumination device) 12 that is an external light source. The liquid crystal panel 11 and the backlight unit 12 are integrally held by a frame-like bezel 13 and the like. Moreover, an X-axis, a Y-axis, and a Z-axis illustrated in parts of the respective drawings are depicted such that the direction of each axis is as illustrated in the drawings.

Figure 3:
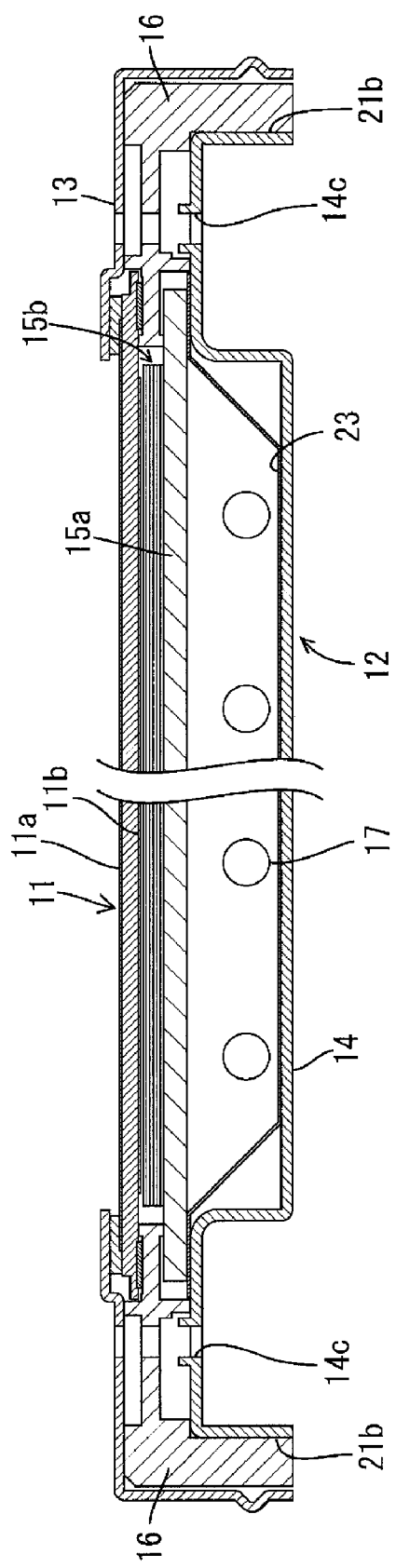
FIG. 3 is a cross-sectional view illustrating the liquid crystal display device cut along a short-side direction.
Figure 4:
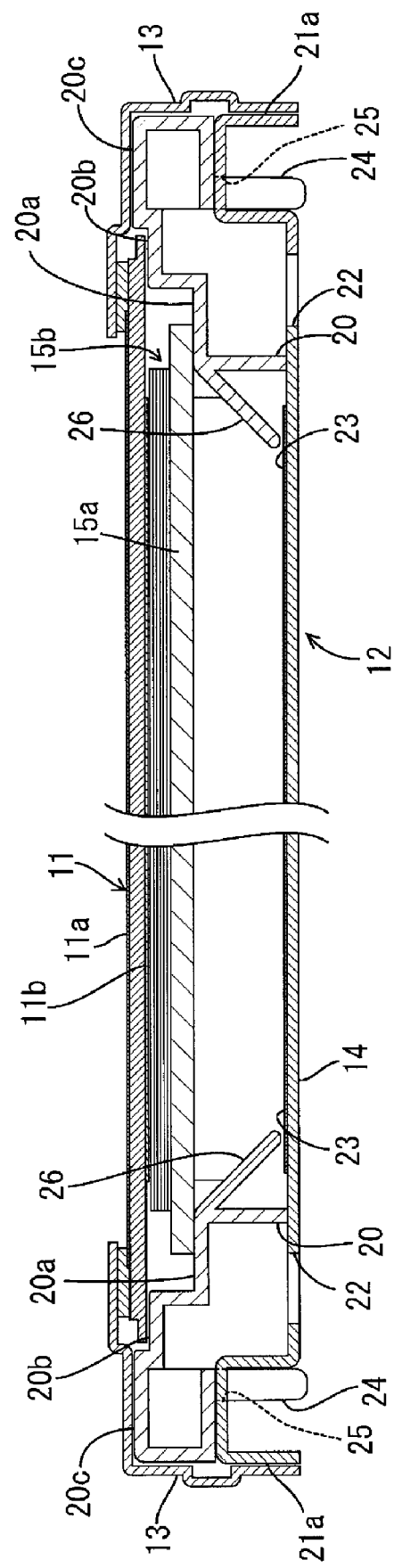
FIG. 4 is a cross-sectional view illustrating the liquid crystal display device cut along a long-side direction.

Next, the liquid crystal panel 11 and the backlight unit 12 comprising the liquid crystal display device 10 will be described (refer to FIGS. 2 to 4).

For the liquid crystal panel (display panel) 11, a pair of glass substrates is pasted together while being separated by a predetermined gap and a liquid crystal is sealed between the two glass substrates. One of the glass substrates is provided with a switching element (for example, a TFT) connected to a source wiring and a gate wiring that intersect each other at right angles, a pixel electrode connected to the switching element, an alignment layer, and the like. The other glass substrate is provided with a color filter on which colored portions such as R (red), G (green) and B (blue) are arranged in a predetermined alignment, a counter electrode, an alignment layer, and the like. Moreover, polarizing plates 11a and 11b are arranged on the outsides of both substrates (refer to FIGS. 3 and 4).

As illustrated in FIG. 2, the backlight unit 12 includes: an approximately box-shaped chassis 14 opened to a light outputting face-side (the side of the liquid crystal panel 11); a diffuser plate 15a arranged so as to cover an opening 14b of the chassis 14; a plurality of optical sheets 15b arranged between the diffuser plate 15a and the liquid crystal panel 11; and a frame 16 arranged along a long side of the chassis 14 which holds a long-side edge part of the diffuser plate 15a by sandwiching the same between the chassis 14. Furthermore, the chassis 14 is interiorly provided with: a cold cathode tube (light source) 17; a lamp clip 18 for mounting the cold cathode tube 17 to the chassis 14; a relay connector 19 responsible for relaying electrical connections at each terminal of the cold cathode tube 17; and a holder 20 that covers all of the terminals of the group of cold cathode tubes 17 and the group of relay connectors 19. Moreover, at the backlight unit 12, the diffuser plate 15a is closer to the light output side than the cold cathode tube 17. The lamp clip 18 has been omitted in FIGS. 2 to 4.

The chassis 14 is metallic and sheet-metal processed, and molded into a shallow, approximately box shape made up of: a rectangular bottom plate; and a folded outer edge part 21 rising from the sides of the bottom plate and folded in an approximate U-shape (a folded outer edge part 21a in a short-side direction and a folded outer edge part 21b in a long-side direction). A plurality of mounting holes 22 for mounting the relay connectors 19 is drilled on both longitudinal ends of the bottom plate of the chassis 14. In addition, as illustrated in FIG. 3, a fixing hole 14c is drilled into an upper face of the folded outer edge part 21b of the chassis 14. For example, the fixing hole 14c enables the bezel 13, the frame 16, the chassis 14 and the like to be integrated by a screw or the like.

A reflection sheet 23 is arranged on an inner face side (the side of the face opposing the cold cathode tube 17) of the bottom plate of the chassis 14. The reflection sheet 23 is made of synthetic resin, has a surface colored white that is a color with superior reflectivity, and is laid along the inside of the bottom plate face of the chassis 14 so as to approximately cover the entire area thereof. As illustrated in FIG. 3, a long-side edge part of the reflection sheet 23 rises so as to cover the folded outer edge part 21b of the chassis 14 and is sandwiched between the chassis 14 and the diffuser plate 15a. The reflection sheet 23 enables light outputted from the cold cathode tube 17 to be reflected to the side of the diffuser plate 15a.

The cold cathode tube 17 has an elongated tubular shape. A large number of cold cathode tubes 17 are housed in the chassis 14 aligned parallel to each other in a state where a longitudinal direction (axial direction) of the tubes is matched with the long-side direction of the chassis 14 (refer to FIG. 2). Moreover, the cold cathode tube 17 is set so as to be slightly elevated off of the bottom plate (reflection sheet 23) of the chassis 14. Each end of the cold cathode tube 17 is fit into a relay connector 19, and the holder 20 is mounted so as to cover the relay connector 19.

The holder 20 is made of white synthetic resin, covers the ends of the cold cathode tubes 17, and has an approximately elongated box shape extending in the short-side direction of the chassis 14. As illustrated in FIG. 4, the holder 20 has a stepped face configured such that the diffuser plate 15a and the liquid crystal panel 11 can be mounted on different levels of a surface side of the stepped face. In addition, the holder 20 is arranged so as to partially overlap with the folded outer edge part 21a in the short-side direction of the chassis 14 and, together with the folded outer edge part 21a, forms a side wall of the backlight unit 12. An insertion pin 24 protrudes from a face of the holder 20 opposing the folded outer edge part 21a of the chassis 14. The holder 20 is mounted onto the chassis 14 when the insertion pin 24 is inserted into an insertion hole 25 formed on an upper face of the folded outer edge part 21a of the chassis 14.

The stepped face of the holder 20 is made up of three faces parallel to the bottom plate face of the chassis 14. A short-side edge part of the diffuser plate 15a is mounted on a lowermost first face 20a. In addition, an inclined cover 26 that inclines toward the bottom plate face of the chassis 14 extends from the first face 20a. A short-side edge part of the liquid crystal panel 11 is mounted on a second face 20b of the stepped face of the holder 20. A topmost third face 20c of the stepped face of the holder 20 is arranged at a position overlapping the folded outer edge part 21a of the chassis 14 so as to be in contact with the bezel 13.

The diffuser plate 15a is a synthetic resin plate-like member dispersedly mixed with light-scattering particles and functions to diffuse linear light outputted from the cold cathode tube 17 that is a tubular light source. As described above, the short-side edge part of the diffuser plate 15a is mounted on the first face 20a of the holder 20 and arranged so as to be unaffected by vertical binding forces. On the other hand, as illustrated in FIG. 3, the long-side edge part of the diffuser plate 15a is sandwiched between and therefore fixed by the chassis 14 (reflection sheet 23) and the frame 16.

The optical sheet 15b arranged on the diffuser plate 15a is a laminated structure of a diffusing sheet, a lens sheet, and a reflective polarizing plate in this order from the side of the diffuser plate 15a, and functions to convert light outputted from the cold cathode tube 17 and passed through the diffuser plate 15a into planar light. The liquid crystal panel 11 is installed on an upper face-side of the optical sheet 15b. The optical sheet 15b is held between the diffuser plate 15a and the liquid crystal panel 11.

Figure 5:
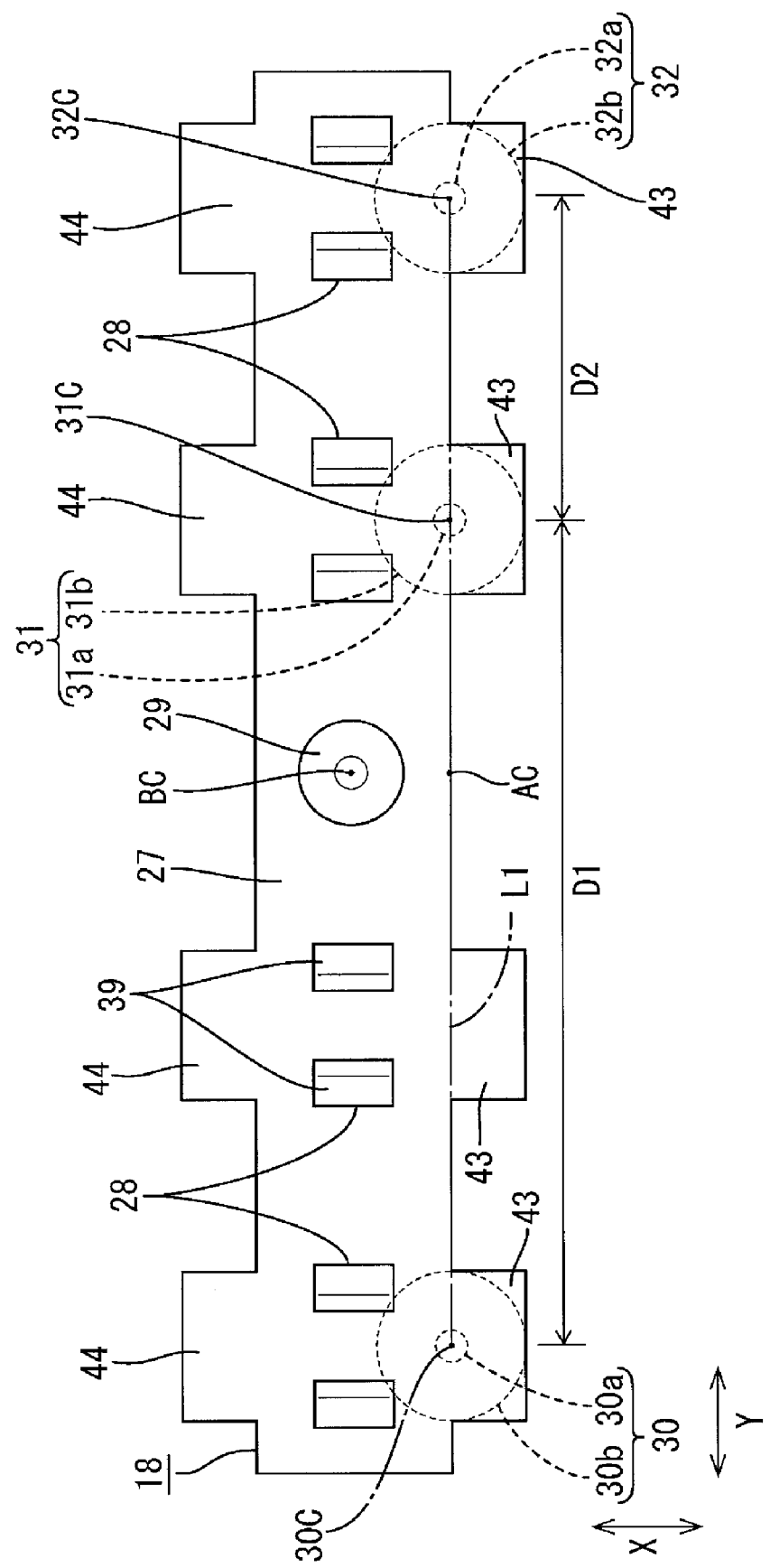
FIG. 5 is a plan view of a lamp clip.
Figure 6:
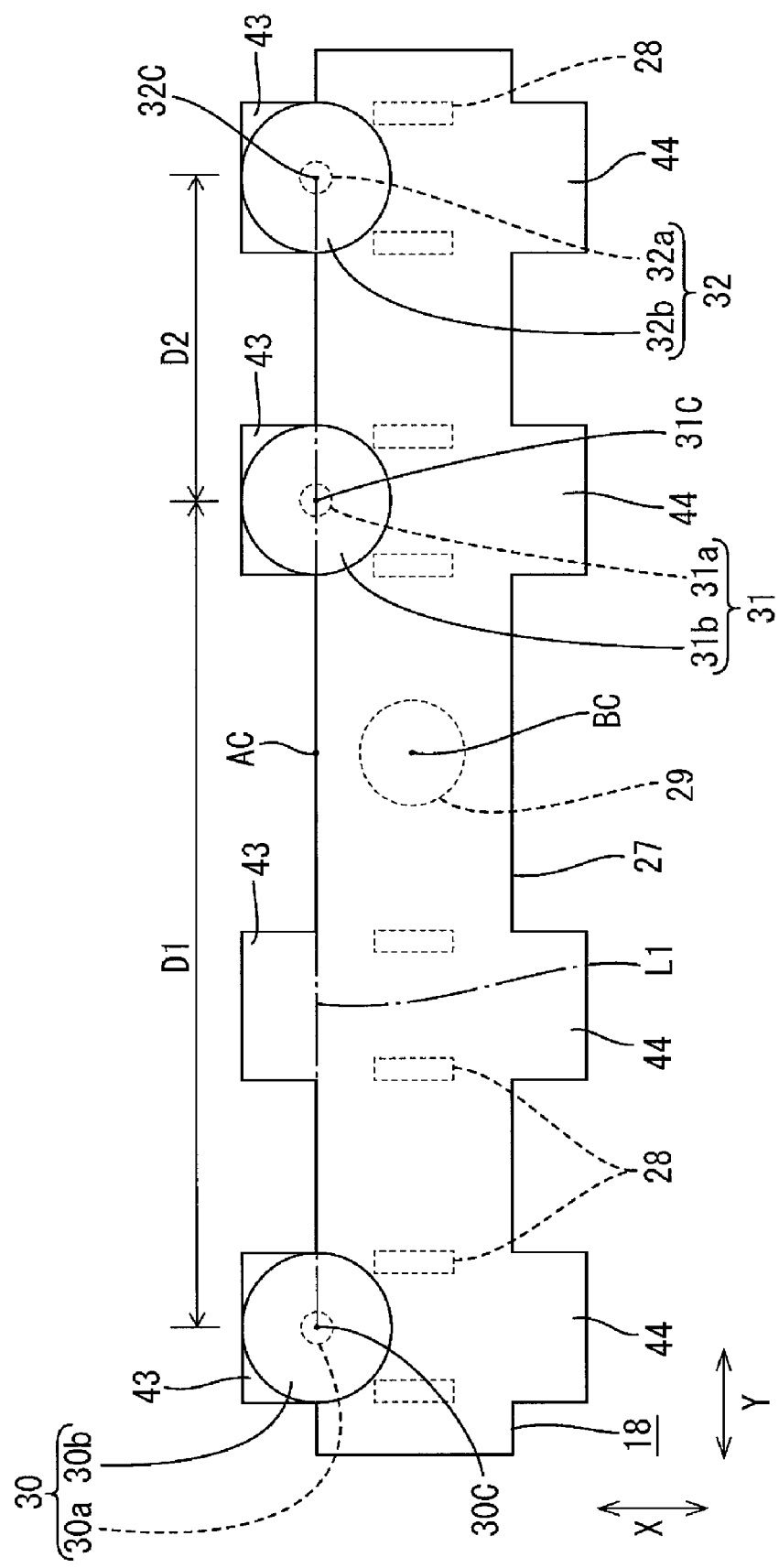
FIG. 6 is a bottom view of the lamp clip.

The lamp clip 18 will now be described in detail. The lamp clip 18 is made of synthetic resin (for example, polycarbonate) and has a surface colored white that is a color with superior reflectivity. As illustrated in FIG. 5 or 6, the lamp clip 18 has an approximately plate-like shape along the chassis 14 and the bottom plate of the reflection sheet 23, and includes a main body 27 (mounting plate, base portion) that is approximately rectangular as seen in plan view. The lamp clip 18 is mounted to the chassis 14 such that a longitudinal direction (long-side direction) of the main body 27 follows the Y-axis direction and the posture (orientation, state) of the lamp clip 18 is approximately parallel to the short-side direction of the chassis 14 or, in other words, approximately parallel to a direction perpendicular to an axial direction (longitudinal direction, X-axis direction) of the cold cathode tube 17. Hereinafter, the upper side with respect to the Z-axis direction as depicted in FIGS. 3 and 4 will be referred to as a front side and the opposite lower side will be referred to as a rear side.

On a surface of the main body 27 (the surface that faces the diffuser plate 15a and the cold cathode tubes 17, the surface away from the chassis 14), lamp gripping portions 28 for supporting the cold cathode tubes 17 at a predetermined vertical position and a supporting pin 29 for supporting the diffuser plate 15a at a position higher than the cold cathode tubes 17 are provided. A plurality (four in the present embodiment) of the lamp gripping portions 28 are separated from each other in the longitudinal direction of the main body 27 so as to grip different cold cathode tubes 17. Intervals between the lamp gripping portions 28 are approximately equal to each other and to intervals between the cold cathode tubes 17 arranged in the chassis 14. The lamp gripping portions 28 are arranged symmetrically with respect to a midpoint BC of the main body 27 or, more specifically, a midpoint of the long side of the main body 27 (with respect to the longitudinal direction or the Y-axis direction) that is also a mid point of the short side of the main body 27 (with respect to the width direction or the X-axis direction). The lamp gripping portions 28 are arranged off the midpoint BC of the main body by a predetermined distance. The supporting pin 29 is arranged with the center thereof on the midpoint BC of the main body 27. In other words, the supporting pin 29 is concentrically arranged with respect to the main body 27. The supporting pin 29 is arranged at an approximately central position between both lamp gripping portions 28 arranged towards the center. On the other hand, on a rear surface (the surface that faces the chassis 14 and the reflection sheet 23, the surface away from the diffuser plate 15a and the cold cathode tubes 17) of the main body 27, three mounting portions 30 to 32 for holding the lamp clips 18 to the chassis 14 are provided. The mounting portions 30 to 32 are separated from each other in the long-side direction of the main body 27. To distinguish the mounting portions 30 to 32 from each other, in order from the left side of FIG. 5, the mounting portions will be referred to as a first mounting portion 30, a second mounting portion 31, and a third mounting portion 32.

Figure 7:
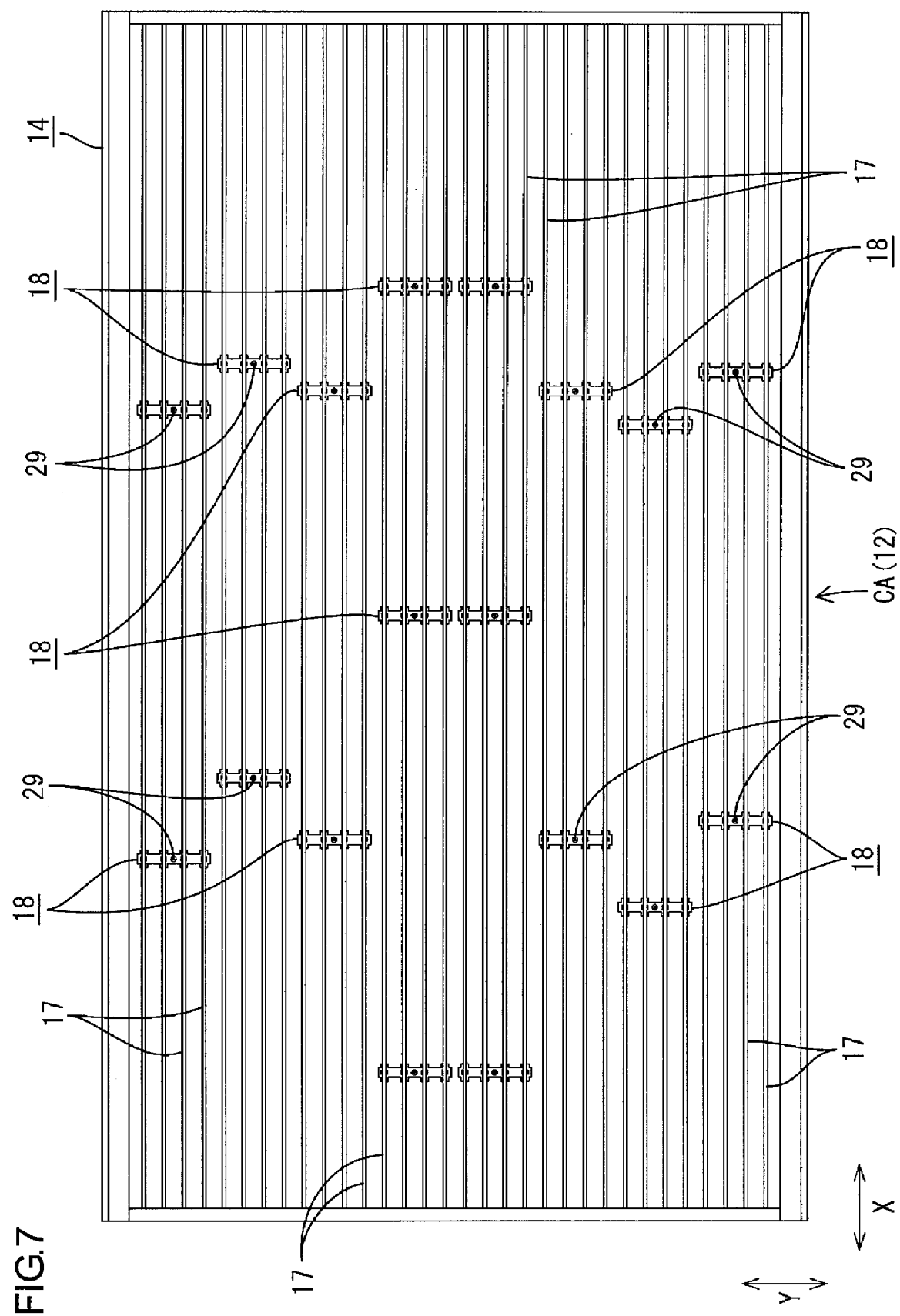
FIG. 7 is a plan view illustrating lamp clips mounted on a chassis.

As illustrated in FIG. 7, the lamp clips 18 are installed at a plurality of positions dispersed on inner faces of the chassis 14 and the reflection sheet 23. The arrangement of the lamp clips 18 will be described below. The lamp clips 18 are installed aligned at a plurality of positions separated from each other in the long-side direction (X-axis direction) of the chassis 14 and the reflection sheet 23 and, as a result, are capable of gripping the cold cathode tubes 17 at a plurality of positions separated from each other in the axial direction. Furthermore, the number of lamp clips 18 installed on the chassis 14 and the bottom plate of the reflection sheet 23 is greater towards the center than towards both ends in the short-side direction (Y-axis direction). Specifically, compared to two groups of three lamp clips 18 installed separated from each other in the long-side direction near the center in the short-side direction of the chassis 14 and the reflection sheet 23, pairs of lamp clips 18 are installed separated in the long-side direction of the chassis 14 and the reflection sheet 23 near both ends in the short-side direction as seen from the six lamp clips 18 near the center. Accordingly, the number of lamp gripping portions 28 or, in other words, support locations with respect to the cold cathode tubes 17, as well as the number of supporting pins 29 or, in other words, support locations with respect to the diffuser plate 15a, are greater near the center in the short-side direction of the chassis 14 and the reflection sheet 23 than near both ends.

Each lamp clip 18 (each of the lamp clips 18 arranged near both ends in the short-side direction as compared to near the center thereof) aligned in pairs in the long-side direction of the chassis 14 and the reflection sheet 23 is arranged at a position displaced in the long-side direction from a lamp clip 18 adjacent in the short-side direction. Therefore, compared to a hypothetical case where the lamp clips 18 are arranged in a single row along the short-side direction, the dispersed arrangement of the lamp clips 18 in the bottom plate face of the reflection sheet 23 makes shadows of the lamp clips 18 less visible due to characteristics of the human eye. In other words, even if the numbers of the lamp clips 18 are the same, a linear or concentrated arrangement makes the lamp clips 18 more visible due to characteristics of the human eye. On the other hand, by arranging the lamp clips 18 so as to be dispersed as in the present embodiment, luminance unevenness is less likely to occur at the backlight unit 12 even if light reflectance differs between the reflection sheet 23 and the lamp clips 18.

Figure 8:
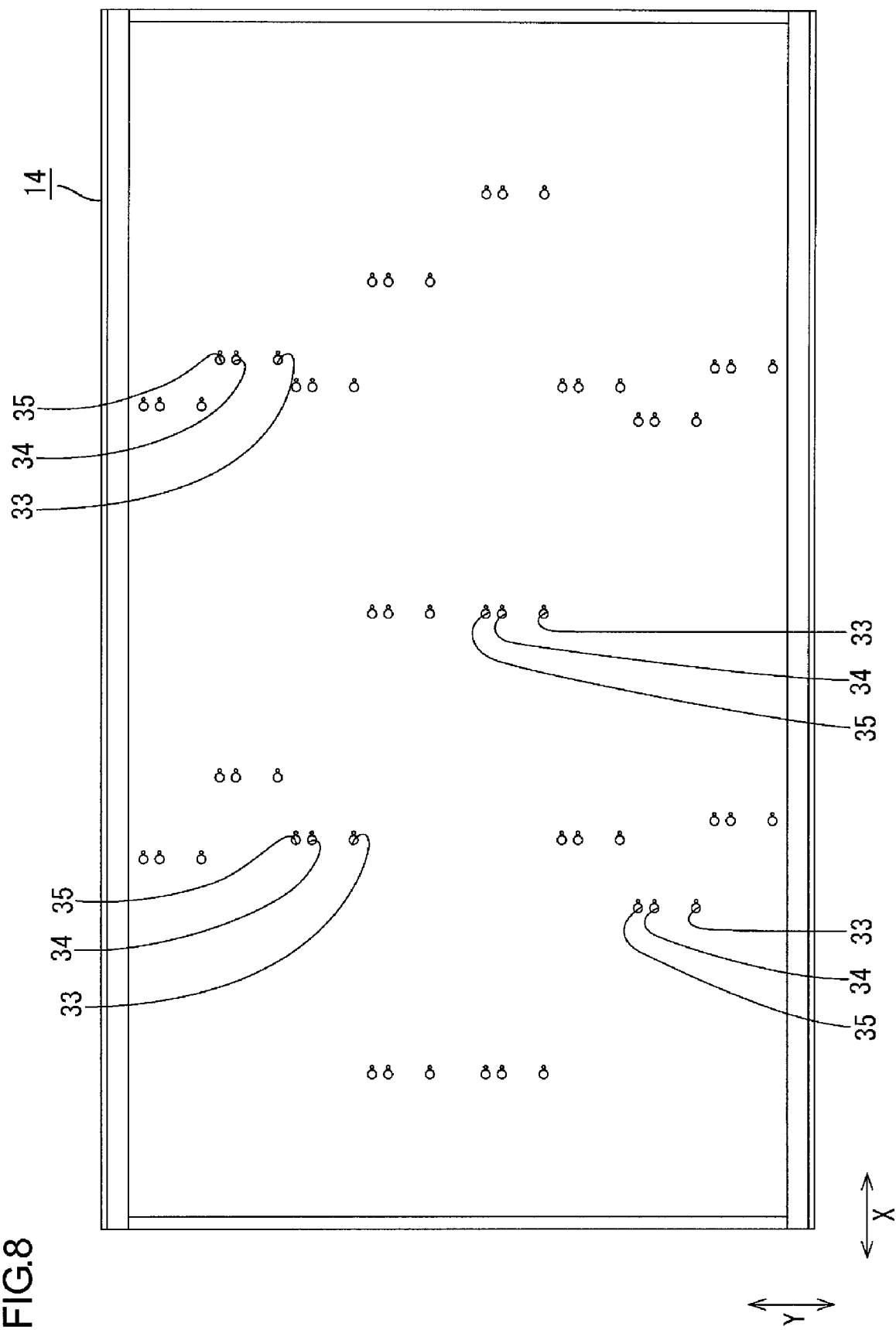
FIG. 8 is a plan view of the chassis.

In addition, as illustrated in FIG. 8, three each of mounting holes 33 to 35 and insertion holes 36 to 38 for enabling the mounting portions 30 to 32 to be inserted into scheduled mounting positions of the lamp clips 18 are respectively formed penetrating in a thickness direction on the chassis 14 and the inner face of the bottom plate of the reflection sheet 23. To distinguish the mounting holes 33 to 35 and the insertion holes 36 to 38 from each other, in order from the left sides of FIGS. 9 and 10, the mounting holes and the insertion holes will be referred to as a first mounting hole 33 and a first insertion hole 36, a second mounting hole 34 and a second insertion hole 37, and a third mounting hole 35 and a third insertion hole 38. The mounting portions 30 to 32, the mounting holes 33 to 35, and the insertion holes 36 to 38 will be described later in detail.

Figure 10:
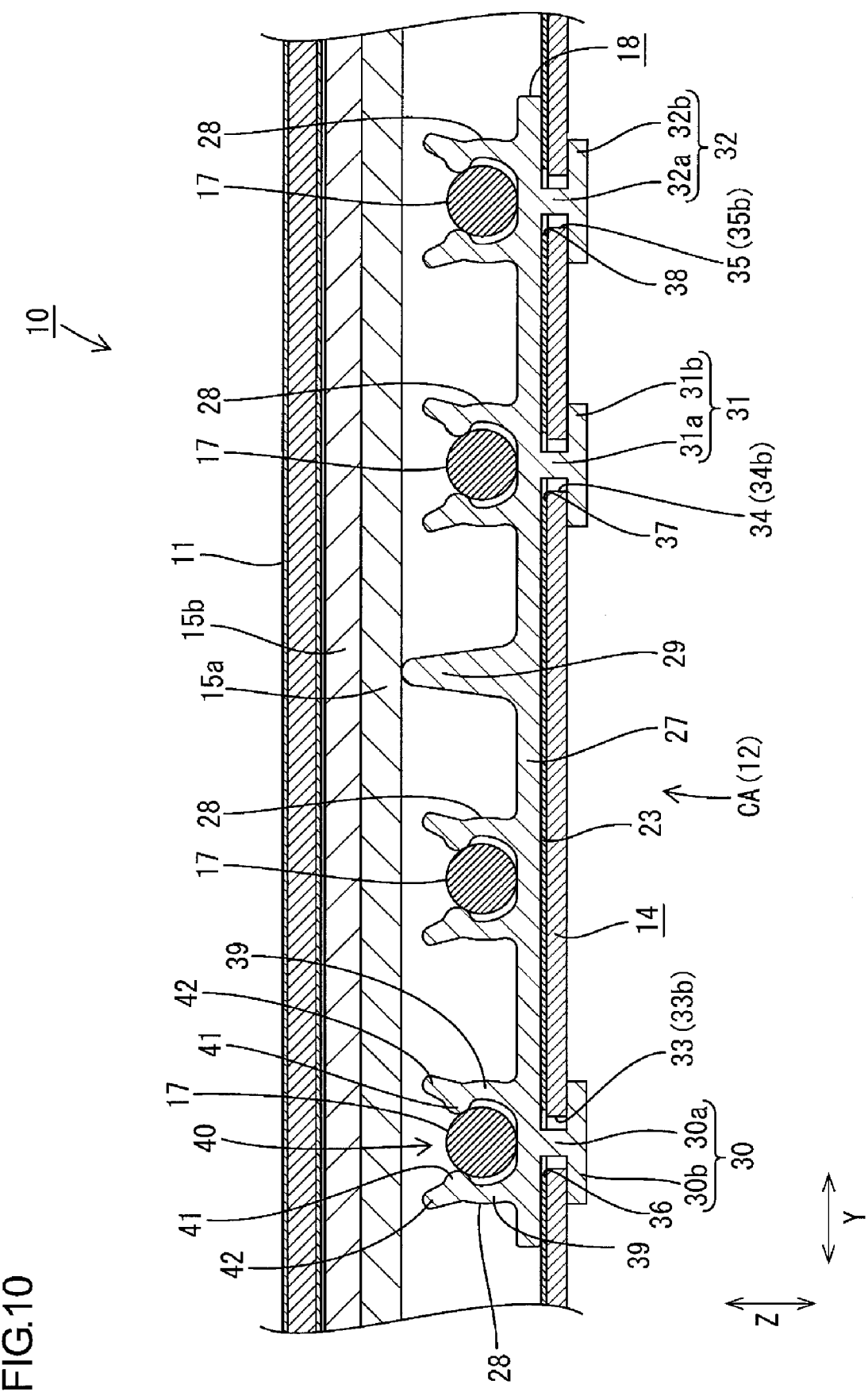
FIG. 10 is a cross-sectional view illustrating lamp clips mounted inside the liquid crystal display device.

The lamp gripping portion 28 that constitutes a supporting structure of the cold cathode tube 17 will now be described in detail. As illustrated in FIG. 10, the lamp gripping portion 28 is capable of supporting a central position between both ends where electrodes are installed among the cold cathode tube 17 or, in other words, a light emitting portion thereof, from a rear side to a vertical position slightly elevated from the reflection sheet 23. The lamp gripping portion 28 has, overall, an open-ended ring shape opened to the front side, and includes a pair of arm portions 39 opposing each other. An opening 40 that permits passage of the cold cathode tube 17 that is attached and detached along the Z-axis direction (thickness directions of the chassis 14 and the bottom plate of the reflection sheet 23) is secured between the tips of both arm portions 39. Both arm portions 39 have cantilever forms respectively rising from positions on a front-side face of the main body 27 separated from each other in a longitudinal direction (Y-axis direction), and have shapes bent in an approximate arc. The curvature of both arm portions 39 is approximately consistent with a curvature of an outer circumferential face of the cold cathode tube 17 to be mounted, and in a mounted state, a gap created between the cold cathode tube 17 is to have an approximately constant width in a circumferential direction. Both arm portions 39 have shapes symmetrical with respect to a symmetrical axis along the Z-axis direction and passing through a center position of the lamp gripping portion 28 in the Y-axis direction. Both arm portions 39 are configured so as to be elastically deformable along a width direction with respect to a rising base end from the main body 27 as a pivot point. In addition, the arm portions 39 are configured such that width dimensions thereof are smaller than the width dimension of the main body 27.

Holding projections 41 for holding the cold cathode tube 17 are respectively provided on inner faces (circumferential surfaces opposing the cold cathode tube 17) of the tips of both arm portions 39. The opening 40 described above is secured between both holding protrusions 41. The clearance of the opening 40 is set so as to be slightly narrower than an outside diameter of the cold cathode tube 17. Therefore, both arm portions 39 are configured so as to be elastically expanded and deformed when pushed by the cold cathode tube 17 during attachment or detachment of the cold cathode tube 17 through the opening 40. The holding projection 41 is formed so as to jut out inwards (towards a central axis line of the cold cathode tube 17) from an inner face of the tip of the arm portion 39, and is arranged at a position that covers the cold cathode tube 17 from the front side (light output side) or, in other words, a position on the side of an extracting direction of the cold cathode tube 17. In a mounted state, the cold cathode tube 17 is configured so as to receive three-point support from a central first supporting point positioned directly below the center of the cold cathode tube 17, and second and third supporting points on inner ends of both holding projections 41 among the bottom face of the lamp gripping portion 28. At the intervals of the supporting points, a slight gap (clearance) extending in a circumferential direction is to be provided between the outer circumferential face of the cold cathode tube 17 and the inner circumferential face of the lamp gripping portion 28.

Guide portions 42 for guiding a mounting operation of the cold cathode tube 17 are respectively provided on outer faces of the tips of both arm portions 39. Both guide portions 42 are formed so as to have a tapered shape rising obliquely outward from the arm portions 39. Both guide portions 42 have inclines that separate from each other from a protruding base end to a protruding tip. Inner faces opposing the cold cathode tube 17 are also configured as sloped faces with similar inclines. Therefore, an interval of inner faces of both guide portions 42 that oppose each other gradually becomes narrower towards the bottom of FIG. 10 or, in other words, towards the side of a mounting direction of the cold cathode tube 17, and conversely gradually becomes wider towards the side of a removing direction of the cold cathode tube 17. Accordingly, the mounting operation of the cold cathode tube 17 can be smoothly guided by the inner faces of both guide portions 42. In addition, the inner faces of the guide portions 42 are smoothly connected as-is to the inner faces of the holding projections 41.

Next, the supporting pin 29 constituting a support structure of the diffuser plate 15a will be described in detail. As illustrated in FIG. 10, the supporting pin 29 is capable of restricting bowing and warping of the diffuser plate 15a to the side of the cold cathode tube 17 by supporting the diffuser plate 15a from the rear side at a part closer to the center of the screen than an outer area supported by the holder 20 and the like. The supporting pin 29 is configured such that the shape of a cross section thereof cut along a horizontal direction is circular (FIG. 5) and is formed so as to have a tapered shape whose diameter gradually decreases from a root side towards a tip side. In other words, the supporting pin 29 is formed so as to have an approximately conical shape. A tip of the supporting pin 29 capable of coming into contact with the diffuser plate 15a is formed with an R face and is rounded. The protruding height of the supporting pin 29 from the main body 27 is set higher than the lamp gripping portion 28. Accordingly, the supporting pin 29 is a site that protrudes the highest among the lamp clip 18. Therefore, when performing an attaching/detaching operation of the lamp clip 18 to/from the chassis 14, a worker can perform the operation by grasping the supporting pin 29. As a result, the supporting pin 29 is also able to function as an operating unit during attachment/detachment.

Next, the mounting portions 30 to 32 constituting a holding structure of the lamp clip 18 with respect to the chassis 14 will be described in detail together with the mounting holes 33 to 35 and the insertion holes 36 to 38 of the chassis 14 and the reflection sheet 23. As illustrated in FIGS. 5, 6, and 10, the mounting portions 30 to 32 include: base portions 30a to 32a protruding from the rear face of the main body 27 to a rear side (the chassis 14 side) along the Z-axis direction; and extending portions 30b to 32b that extend from the distal ends of the respective base portions 30a to 32a in X-axis and Y-axis directions (a direction along the main body 27). The base portions 30a to 32a are configured so as to have a circular cross-sectional shape and a diameter approximately constant across entire lengths thereof. In other words, the base portions 30a to 32a are cylindrically formed. The extending portions 30b to 32b have a flange shape radially spreading from the distal ends of the respective base portions 30a to 32a. The extending portions 30b to 32b are formed as circular plates as seen in plan view whose diameters are larger than the base portions 30a to 32a. The extending portions 30b to 32b are arranged concentrically with respect to the base portions 30a to 32a. In addition, centers 30C to 32C of the mounting portions 30 to 32 are arranged at positions consistent in the Y-axis direction with respect to the center positions in the Y-axis direction of corresponding lamp gripping portions 28 and a central axis line of the cold cathode tube 17.

Figure 9:
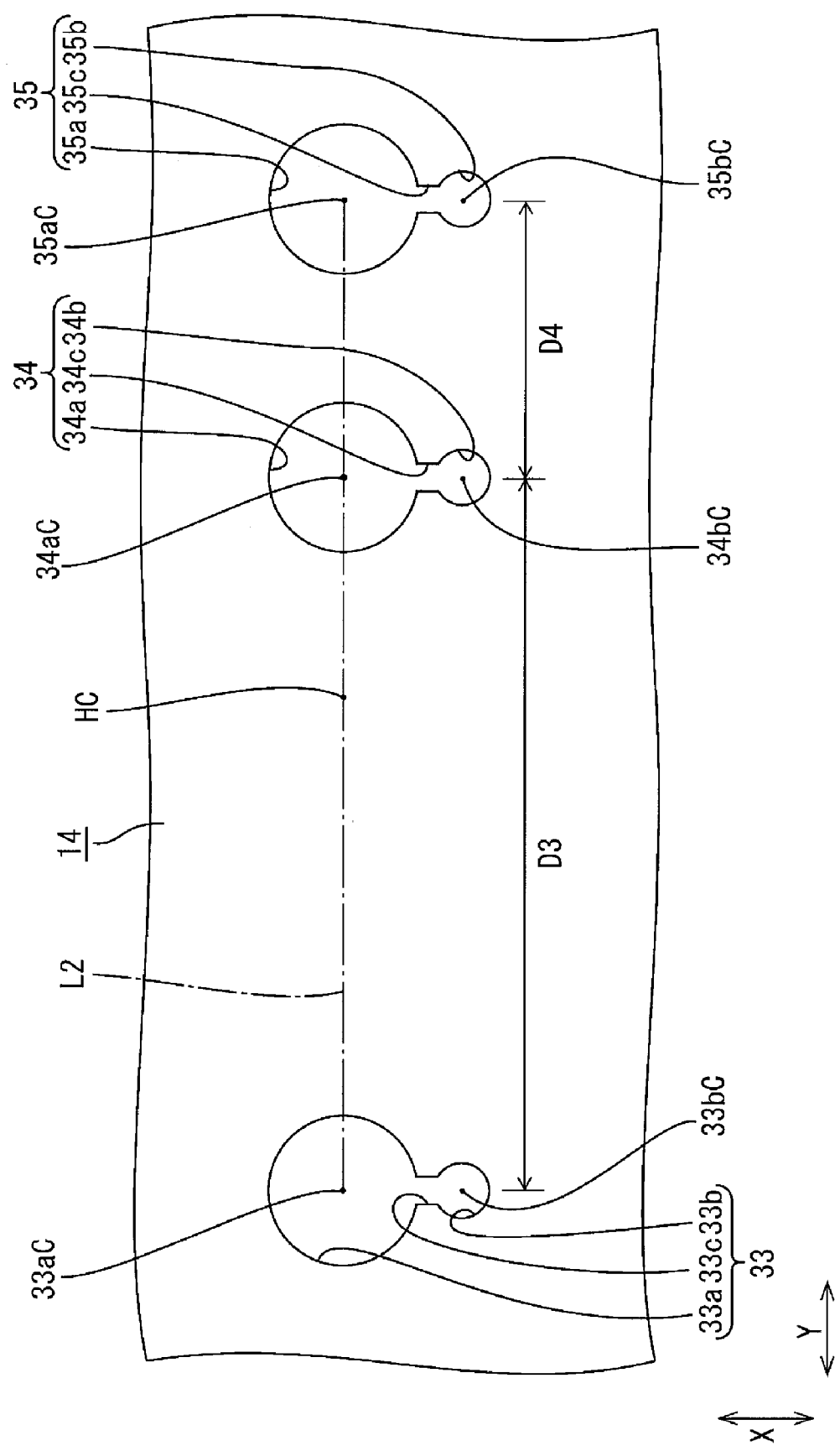
FIG. 9 is a magnified plan view of the chassis around mounting holes.

On the other hand, as illustrated in FIG. 9, the mounting holes 33 to 35 provided on the chassis 14 include: large diameter portions 33a to 35a with relatively large diameter sizes; small diameter portions 33b to 35b arranged at positions separated by predetermined intervals from the large diameter portions 33a to 35a and having relatively small diameter sizes; and communicating portions 33c to 35c that communicate the large diameter portions 33a to 35a with the small diameter portions 33b to 35b. The large diameter portions 33a to 35a and the small diameter portions 33b to 35b are both formed circular as seen in plan view. The communicating portions 33c to 35c that communicate the large diameter portions 33a to 35a with the small diameter portions 33b to 35b are configured so as to have straight shapes with constant widths as seen in plan view.

The large diameter portions 33a to 35a are formed such that diameter sizes thereof are greater than the diameter sizes of the extending portions 30b to 32b at the mounting portions 30 to 32. Accordingly, the extending portions 30b to 32b or, in other words, the mounting portions 30 to 32 can be inserted into the large diameter portions 33a to 35a. In comparison, the small diameter portions 33b to 35b are formed such that diameter sizes thereof are greater than the diameter sizes of the base portions 30a to 32a at the mounting portions 30 to 32 but smaller than the diameter sizes of the extending portions 30b to 32b.

The large diameter portions 33a to 35a and the small diameter portions 33b to 35b are arranged aligned along the X-axis direction (the longitudinal direction of the cold cathode tube 17, the short-side direction of the main body 27). In other words, the large diameter portions 33a to 35a and the small diameter portions 33b to 35b are arranged such that lines connecting centers 33aC to 35aC and 33bC to 35bC thereof become parallel with the X-axis direction. The small diameter portions 33b to 35b are arranged at positions displaced towards the near side as illustrated in FIG. 9 (the left side in FIG. 8) with respect to the large diameter portions 33a to 35a. In addition, the communicating portions 33c to 35c are formed such that width sizes thereof are greater than the diameter sizes of the base portions 30a to 32a at the mounting portions 30 to 32 but smaller than the diameter sizes of the small diameter portions 33b to 35b so as to enable the base portions 30a to 32a to move through the communicating portions 33c to 35c between the large diameter portions 33a to 35a and the small diameter portions 33b to 35b. Moreover, center positions in the width direction of the communicating portions 33c to 35c are arranged on lines connecting the centers 33aC to 35aC of the large diameter portions 33a to 35a and the centers 33bC to 35bC of the small diameter portions 33b to 35b.

As illustrated in FIG. 10, the insertion holes 36 to 38 formed on the reflection sheet 23 are arranged at positions consistent with the mounting holes 33 to 35 when the reflection sheet 23 is laid in the chassis 14. With the exception of being formed so as to be slightly larger than the mounting holes 33 to 35 of the chassis 14, the shapes of the insertion holes 36 to 38 as seen in plan view are similar to the shapes of the mounting holes 33 to 35. Moreover, the difference in sizes between the mounting holes 33 to 35 and the insertion holes 36 to 38 is set to the same or greater than an assumed maximum value of a positional displacement that may occur between the mounting holes 33 to 35 and the insertion holes 36 to 38 when assembling the reflection sheet 23 onto the chassis 14. Accordingly, the mounting holes 33 to 35 are reliably arranged on the insides of the insertion holes 36 to 38. As a result, situations where the mounting holes 33 to 35 are covered by the reflection sheet 23 can be avoided.

Figure 11:
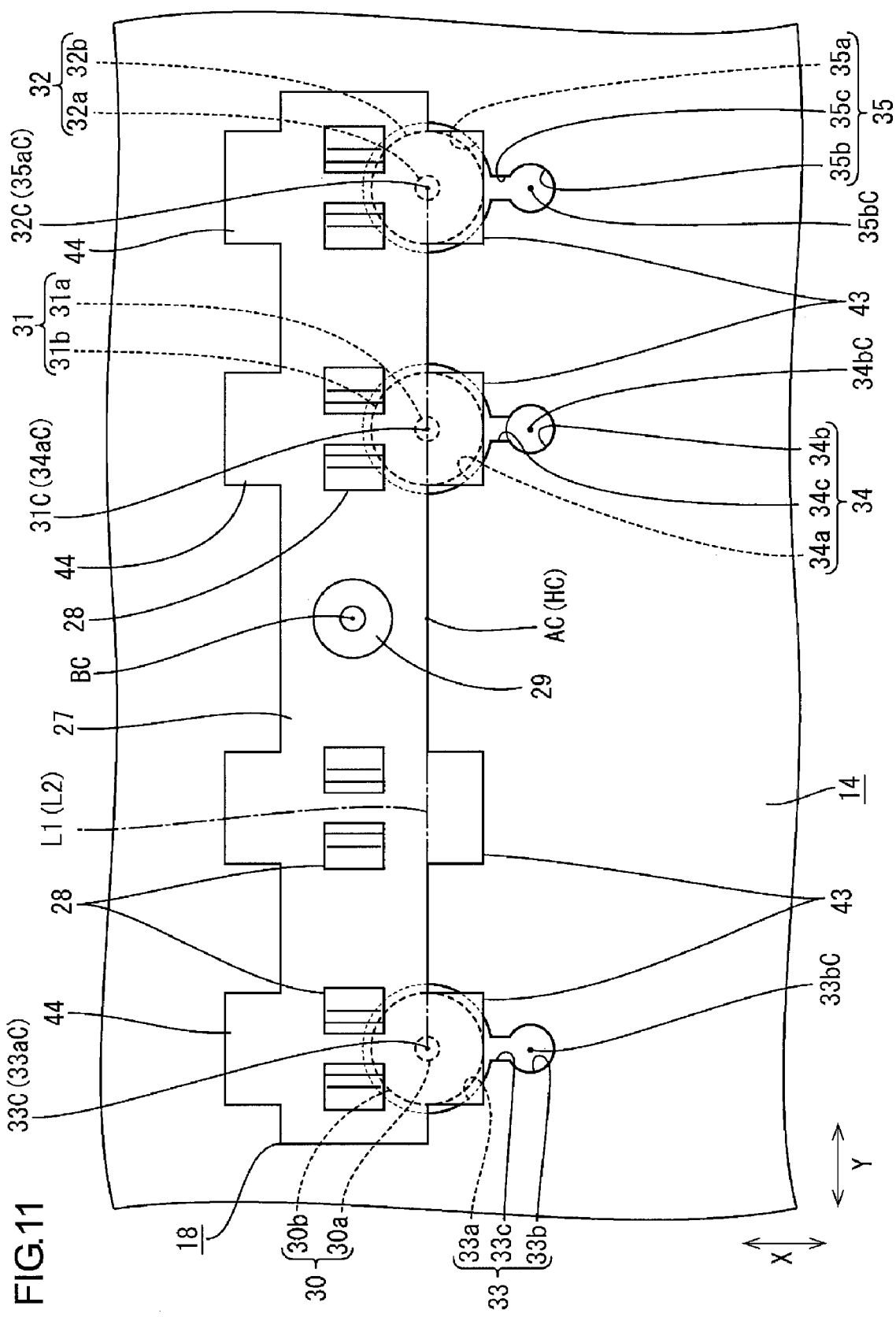
FIG. 11 is a plan view illustrating mounting portions of the lamp clip aligned with respective mounting holes, which are referred to as the first mounting condition.
Figure 12:
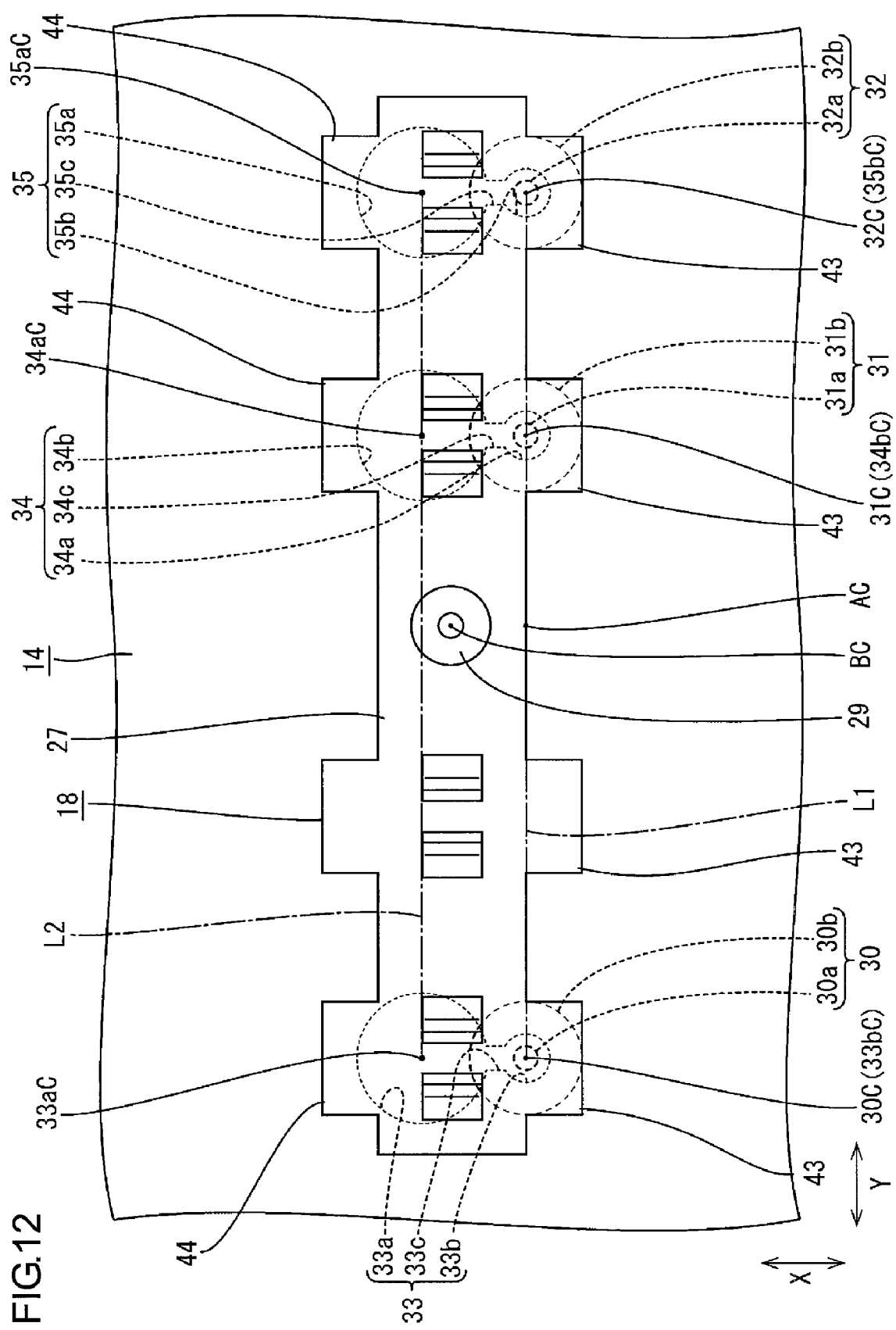
FIG. 12 is a plan view illustrating the lamp clip slid for mounting from the first mounting condition.

The lamp clip 18 is mounted onto the chassis 14 as described below. That is, when the lamp clip 18 is pushed into the chassis 14 in a state where all of the mounting portions 30 to 32 are concentrically matched (aligned) with corresponding mounting holes 33 to 35 and the large diameter portions 33a to 35a of the insertion holes 36 to 38, the extending portions 30b to 32b of the mounting portions 30 to 32 are inserted into the insertion holes 36 to 38 and the large diameter portions 33a to 35a of the mounting holes 33 to 35 (FIG. 11). As the lamp clip 18 is slid in the X-axis direction (the short-side direction of the main body 27) from the side of the large diameter portions 33a to 35a to the side of the small diameter portions 33b to 35b from a state where the extending portions 30b to 32b are protruding to the rear side of the chassis 14, the base portions 30a to 32a travel through the communicating portions 33c to 35c to move the mounting portions 30 to 32 from the large diameter portions 33a to 35a to the small diameter portions 33b to 35b. In a mounted state, the mounting portions 30 to 32 are concentrically arranged with respect to the small diameter portions 33b to 35b of the mounting holes 33 to 35 and rims of the small diameter portions 33b to 35b of the mounting holes 33 to 35 and the communicating portions 33c to 35c are sandwiches between the extending portions 30b to 32b of the mounting portions 30 to 32 and the main body 27. As a result, the lamp clip 18 is to the chassis 14 and the reflection sheet 23 when it is mounted (FIG. 12). Moreover, slide amounts of the lamp clip 18 necessary for attachment/detachment are set approximately equal to the length of lines connecting the centers 33aC to 35aC of the large diameter portions 33a to 35a and the centers 33bC to 35bC of the small diameter portions 33b to 35b.

The direction (the X-axis direction towards a near side as illustrated in FIGS. 9 and 11 (rightward in FIGS. 7 and 8)) of sliding of the lamp clip 18 associated with mounting is consistent with a direction heading from the large diameter portions 33a to 35a to the small diameter portions 33b to 35b at the mounting holes 33 to 35. Conversely, the direction (the X-axis direction towards a far side as illustrated in FIGS. 9 and 12 (leftward in FIGS. 7 and 8)) of sliding of the lamp clip 18 associated with removing is consistent with a direction heading from the small diameter portions 33b to 35b to the large diameter portions 33a to 35a. Hereinafter, the direction of sliding of the lamp clip 18 associated with mounting will be referred as frontward. Conversely, the direction of sliding of the lamp clip 18 associated with removing will be referred as rearward.

In the present embodiment, the mounting portions 30 to 32 and the mounting holes 33 to 35 (insertion holes 36 to 38) are arranged in relative positions so as to restrict mounting of the lamp clip 18 to the chassis 14 in an orientation other than a predefined orientation. In other words, during mounting onto the chassis 14, while the lamp clip 18 enters a state where the main body 27 is set along the bottom plate of the chassis 14 and the long-side direction of the main body 27 is matched with (conformed to) the short-side direction of the chassis 14, two such states exist that are 180-degree rotations of the main body 27 around a predetermined point. In addition, the mounting portions 30 to 32 and the mounting holes 33 to 35 are arranged so as to match each other when the lamp clip 18 is mounted in a first state (one of the states, the state illustrated in FIG. 11) among the two aforementioned states, while predetermined mounting portions 30 to 32 become inconsistent with corresponding mounting holes 33 to 35 when the lamp clip 18 is mounted in a second state (the other state, the state illustrated in FIG. 13). Hereinafter, a specific configuration will be described in detail.

As illustrated in FIGS. 5 and 6, the mounting portions 30 to 32 are arranged separated from each other in the long-side direction of the main body 27. The mounting portions 30 to 32 are linearly arranged along the same long-side direction (Y-axis direction). In other words, the mounting portions 30 to 32 are arranged such that the centers 30C to 32C thereof are aligned on a line L1 extending parallel to the long-side direction of the main body 27. Specifically, among the mounting portions 30 to 32, the first mounting portion 30 is arranged at a position that is approximately the same as a leftmost lamp gripping portion 28 as illustrated in FIG. 5 with respect to the long-side direction of the main body 27. The second mounting portion 31 is arranged at a position that is approximately the same as the lamp gripping portion 28 second from the rightmost as illustrated in FIG. 5 with respect to the long-side direction of the main body 27. The third mounting portion 32 is arranged at a position that is approximately the same as a rightmost lamp gripping portion 28 as illustrated in FIG. 5 with respect to the long-side direction of the main body 27.

A distance D1 between the first mounting portion 30 and the second mounting portion 31 is larger than a distance D2 between the second mounting portion 31 and the third mounting portion 32. Among the distances between the mounting portions 30 to 32, the distance between the first mounting portion 30 and the third mounting portion 32 located at respective ends is the largest and is equal to a sum of the distances D1 and D2 described above. The mounting portions 30 to 32 are arranged off the midpoint BC of the main body in the long-side direction.

The mounting portions 30 to 32 are arranged asymmetrically with respect to a midpoint AC between the first mounting portion 30 and the third mounting portion 32 located at respective ends (the distance therebetween is the largest). Namely, they are arranged asymmetrically with respect to the midpoint AC that bisects a line connecting the first mounting portion 30 and the third mounting portion 32. This is apparent from the fact that the second mounting portion 31 is arranged at a position separated by a predetermined distance from the midpoint AC and a mounting portion does not exist at a position that is point-symmetrical to the second mounting portion 31 with respect to the midpoint AC. Moreover, the distance from the first mounting portion 30 to the midpoint BC of the main body 27 and the distance from the third mounting portion 32 to the midpoint BC of the main body 27 is approximately equal to each other. Namely, the first mounting portion 30 and the third mounting portion 32 are provided symmetrically with respect to the midpoint BC. Therefore, the midpoint AC between the first mounting portion 30 and the third mounting portion 32 is assumed to be at the same position as the midpoint BC in the long-side direction of the main body 27.

The mounting holes 33 to 35 are provided in locations corresponding to the respective mounting portions 30 to 32 described above. In other words, the mounting holes 33 to 35 are linearly arranged in the short-side direction of the chassis 14 (Y-axis direction) as illustrated in FIG. 8 and arranged such that centers 33aC to 35aC of large diameter portions 33a to 35a thereof are aligned on a line L2 extending parallel to the short-side direction of the chassis 14 as illustrated in FIG. 9. Moreover, the centers 33bC to 35bC of the small diameter portions 33b to 35b are similarly aligned parallel to the short-side direction of the chassis 14. In addition, a distance D3 between the first mounting hole 33 and the second mounting hole 34 is set approximately equal to the aforementioned distance D1 between the first mounting portion 30 and the second mounting portion 31, and a distance D4 between the second mounting hole 34 and the third mounting hole 35 is set approximately equal to the distance D2 between the second mounting portion 31 and the third mounting portion 32. Among the distances between the mounting holes 33 to 35, the distance between the first mounting hole 33 and the third mounting hole 35 respectively positioned at both ends is the greatest and is equal to a sum of the distances D3 and D4 described above.

The mounting holes 33 to 35 are provided asymmetrically with respect to a midpoint HC between the first mounting hole 33 and the third mounting hole 35 located at respective ends (the distance therebetween is the largest). Namely, they are arranged asymmetrically with respect to the midpoint HC that bisects a line connecting the first mounting hole 33 and the third mounting hole 35. This is apparent from the fact that the second mounting hole 34 is arranged at a position separated by a predetermined distance from the midpoint HC and a mounting hole does not exist at a position that is point-symmetrical to the second mounting hole 34 with respect to the midpoint HC. Since the arrangement of the insertion holes 36 to 38 is the same as the arrangement of the mounting holes 33 to 35, a description thereof will be omitted.

When mounting the lamp clip 18 having the mounting portions 30 to 32 arranged as described above onto the chassis 14, the first mounting portion 30 and the third mounting portion 32 arranged at both ends among the mounting portions 30 to 32 are conformed to the first mounting hole 33 and the third mounting hole 35 arranged at both ends among the mounting holes 33 to 35. However, two such states (mounting postures) exist, namely, a first state (FIG. 11) where the first mounting portion 30 conforms to the first mounting hole 33 and the third mounting portion 32 conforms to the third mounting hole 35 and a second state (FIG. 13) where the first mounting portion 30 conforms to the third mounting hole 35 and the third mounting portion 32 conforms to the first mounting hole 33. The lamp clip 18 in the first state and the lamp clip 18 in the second state are 180-degree rotations from each other around the midpoint AC. In addition, while the second mounting portion 31 conforms to the second mounting hole 34 in the first state, the second mounting portion 31 does not conform to the second mounting hole 34 in the second state and insertion cannot be performed. Furthermore, in the second state, the second mounting portion 31 and the second mounting hole 34 are to be arranged at positions symmetrical to each other with respect to a line passing through the midpoints AC and HC. Moreover, the direction of rotation of the lamp clip 18 around the midpoint AC is set parallel to a face along the X-axis direction and the Y-axis direction (a face parallel to the main body 27 and the bottom plate of the chassis 14, a face orthogonal to insertion directions of the mounting portions 30 to 32 into the mounting holes 33 to 35).

Meanwhile, the mounting portions 30 to 32 are arranged at eccentric positions with respect to the short-side direction (direction of sliding accompanying attachment/detachment, X-axis direction) of the main body 27. Specifically, the mounting portions 30 to 32 are arranged at positions separated by a predetermined interval in the short-side direction of the main body 27 with respect to the center (midpoint BC) of the short-side direction of the main body 27, and the eccentricity direction thereof or, in other words, the direction from the center of the short-side direction of the main body 27 towards the mounting portion 30 to 32 is consistent with the sliding direction (movement direction) when the lamp clip 18 in the first state is mounted to the chassis 14 (FIG. 11). To put it the other way around, the lamp clip 18 is arranged so as to be mounted to the chassis 14 in a state where the mounting portions 30 to 32 eccentrically arranged with respect to the short-side direction of the main body 27 are oriented frontward. The state where the mounting portions 30 to 32 are oriented frontward is to be the first state where all of the mounting portions 30 to 32 are consistent with the mounting holes 33 to 35. Therefore, when the lamp clip 18 is set to the first state, the mounting portions 30 to 32 are to be displaced frontward from the center of the short-side direction of the main body 27 and the line L1 connecting the centers 30C to 32C of the mounting portions 30 to 32 is to be arranged at a position displaced frontward with respect to the midpoint BC of the main body 27. In addition, the mounting portions 30 to 32 are arranged at front end positions of the main body 27 in the first state and the line L1 connecting the centers 30C to 32C is consistent with a front end face of the main body 27.

As illustrated in FIGS. 5 and 6, projecting portions 43 and 44 respectively protruding forward and backward are provided at both front and rear ends along the long-side direction of the main body 27. Specifically, a front end along the long-side direction of the main body 27 or, in other words, an end on the eccentric side of the mounting portions 30 to 32 is provided by first projecting portions 43 that protrude frontward or, in other words, in a direction from the center of the short-side direction of the main body 27 towards the mounting portions 30 to 32. Four first projecting portions 43 are provided aligned at positions separated from each other in the long-side direction of the main body 27 and corresponding to the lamp gripping portions 28 in the same long-side direction. In other words, the first projecting portions 43 can be described as being formed partially protruding from the front end of the main body 27. In addition, the mounting portions 30 to 32 eccentrically arranged with respect to the short-side direction of the main body 27 are coupled to the first projecting portions 43. Specifically, the mounting portions 30 to 32 are arranged at positions such that the base portions 30a to 32a thereof are coupled while straddling the front end of the main body 27 and protruding base ends (root portions) of corresponding first projecting portions 43.

The width sizes (sizes in the Y-axis direction) of the first projecting portions 43 are set approximately the same as the diameter sizes of the extending portions 30b to 32b of the mounting portions 30 to 32. In addition, the frontward protruding sizes (sizes in the X-axis direction) of the first projecting portions 43 are set approximately half of the diameter sizes of the extending portions 30b to 32b of the mounting portions 30 to 32. Therefore, when seen in plan view, the entire area of the mounting portions 30 to 32 are hidden on the rear side of the main body 27 and the first projecting portions 43. In other words, the mounting portions 30 to 32 do not protrude outward from an outer peripheral end face of the main body 27 and the first projecting portions 43. Furthermore, the front face and both lateral faces of the first projecting portions 43 corresponding to the mounting portions 30 to 32 form tangential lines with respect to outer circumferential faces of the extending portions 30b to 32b of the mounting portions 30 to 32.

On the other hand, a rear end along the long-side direction of the main body 27 or, in other words, an end opposite to the side of the mounting portions 30 to 32 is provided with second projecting portions 44 that protrude rearward or, in other words, in a direction from the mounting portions 30 to 32 towards the center of the short-side direction of the main body 27. The second projecting portions 43 are formed partially protruding from the rear end of the main body 27 in the same manner as the first projecting portions 43. Four second projecting portions 44 are provided aligned at positions separated from each other in the long-side direction of the main body 27 and corresponding to the lamp gripping portions 28 and the first projecting portions 43. The width sizes and rearward protruding sizes of the second projecting portions 44 are set approximately the same as the width sizes and rearward protruding sizes of the first projecting portions 43.

The mounting holes 33 to 35 are configured so as to be closed by the main body 27, the first projecting portions 43 and the second projecting portions 44 in a state where the lamp clip 18 is mounted to the chassis 14 (FIG. 12). Specifically, since the mounting portions 30 to 32 are eccentrically arranged with respect to the short-side direction of the main body 27, a major part of the mounting holes 33 to 35 are to be closed by a part closer to the center in the short-side direction than the mounting portions 30 to 32 of the main body 27. Here, since the mounting portions 30 to 32 are arranged at the front end position of the main body 27, a major part of the mounting holes 33 to 35 can be closed using an entire area (entire width region) in the short-side direction of the main body 27 and a part (the front end-side part in the direction of sliding accompanying mounting) of the small diameter portions 33b to 35b among the mounting holes 33 to 35 can be closed by the first projecting portions 43. Therefore, compared to a hypothetical case where the mounting portions 30 to 32 are arranged at the center of the short-side direction of the main body 27, the main body 27 can be downsized in the short-side direction by just the amount of displacement of the mounting portions 30 to 32 from the center.

Furthermore, in a mounted state, a part (the rear end-side part in the direction of sliding accompanying mounting) of the large diameter portions 33a to 35a among the mounting holes 33 to 35 can be closed by the second projecting portions 44 (FIG. 12). In other words, since the second projecting portions 44 are partially provided on the main body 27 so as to close the mounting holes 33 to 35, the entire main body 27 need not be widened. As a result, the surface area of the lamp clip 18 can be reduced and risk of occurrences of luminance unevenness can be lowered even when the reflection efficiencies of the reflection sheet 23 and the lamp clip 18 differ from each other. In addition, material cost can also be reduced. Moreover, the short-side dimension (width size) of the main body 27 is set smaller than a maximum length size of the mounting holes 33 to 35 (a distance between points where a line passing through the centers 33aC to 35aC of the large diameter portions 33a to 35a and the centers 33bC to 35bC of the small diameter portions 33b to 35b intersect a circumferential face of the large diameter portions 33a to 35a and a circumferential face of the small diameter portions 33b to 35b.

The present embodiment is structured as described above. Next, operations of the present embodiment will be described. The liquid crystal panel 11 and the backlight unit 12 are separately manufactured and then assembled using the bezel 13 and the like to produce the liquid crystal display device 10 illustrated in FIGS. 3 and 4. Next, an assembly operation of the backlight unit 12 or, more particularly, an assembly operation of the chassis assembly CA involving mounting the lamp clip 18 to the chassis 14 will be described.

When the reflection sheet 23 is laid inside the chassis 14, corresponding mounting holes 33 to 35 are positioned so as to approach into the insertion holes 36 to 38. Subsequently, an operation for mounting the lamp clips 18 to the chassis 14 is performed. Mounting involves inserting the mounting portions 30 to 32 into the mounting holes 33 to 35 at scheduled mounting positions of the chassis 14 while matching the long-side direction of the main body 27 to the short-side direction of the chassis 14. At this point, the lamp clip 18 may assume either one of two states, namely, a first state where the mounting portions 30 to 32 face frontward and a second state rotated by 180 degrees around the midpoint AC from the first state and where the mounting portions 30 to 32 face rearward. In comparison thereto, the present embodiment is arranged such that mounting of the lamp clip 18 is only allowed when the mounting portions 30 to 32 and the mounting holes 33 to 35 are in the first state. First, a case where the lamp clip 18 is in the first state will be described.

By conforming the first mounting portion 30 and the third mounting portion 32 on both ends among the mounting portions 30 to 32 of the lamp clip 18 in the first state to the corresponding first mounting hole 33 and third mounting hole 35, the second mounting portion 31 also conforms to the second mounting hole 34. When the lamp clip 18 is pushed into the chassis 14 in this state, the extending portions 30b to 32b of the mounting portions 30 to 32 are respectively inserted into the large diameter portions 33a to 35a of the mounting holes 33 to 35 as illustrated in FIG. 11. At this point, the distance from the front end face of the first projecting portion 43 to the front end position of the small diameter portions 33b to 35b among the mounting holes 33 to 35 is smaller than the slide amount of the lamp clip 18 due to mounting, and the distance from the rear end face of the second projecting portion 44 to the rear end position of the large diameter portions 33a to 35a among the mounting holes 33 to 35 is greater than the slide amount of the lamp clip 18 due to mounting. In addition, at this point, a distance from the center in the short-side direction of the main body 27 towards the mounting portions 30 to 32 is the same as a direction from the large diameter portions 33a to 35a towards the small diameter portions 33b to 35b among the mounting holes 33 to 35.

Once the extending portions 30b to 32b of the mounting portions 30 to 32 pass through the insertion holes 36 to 38 and the mounting holes 33 to 35 and protrude out from the rear side of the chassis 14, the lamp clip 18 is slid frontward along the short-side direction of the main body 27. Consequently, the base portions 30a to 32a pass through the large diameter portions 33a to 35a and the communicating portions 33c to 35c and enter the small diameter portions 33b to 35b, and the extending portions 30b to 32b become arranged so as to oppose the rim of the mounting holes 33 to 35 among the chassis 14 on the rear side of the peripheral part. Once the lamp clip 18 is moved to its normal position, the mounting portions 30 to 32 become concentrically arranged to the small diameter portions 33b to 35b as illustrated in FIG. 12. At this point, as illustrated in FIG. 10, the rims (in particular, the rims of the small diameter portions 33b to 35b and the communicating portions 33c to 35c) of the mounting holes 33 to 35 are held between the extending portions 30b to 32b of the mounting portions 30 to 32 and the main body 27. Accordingly, the lamp clip 18 is held in a mounted state with respect to the chassis 14 and the reflection sheet 23. As illustrated in FIG. 12, when the lamp clip 18 is mounted, the mounting holes 33 to 35 are completely covered by the main body 27, the first projecting portion 43 and the second projecting portion 44 of the lamp clip 18 such that no openings are present in the chassis 14 and thus the inside of the chassis 14 is not exposed to the outside. Furthermore, since the rims of the mounting holes 33 to 35 are sandwiches between the main body 27 and the flange-shaped extending portions 30b to 32b of the mounting portions 30 to 32 when the lamp clip 18 is mounted, a sufficient holding area can be secured and a high retaining force is applied.

Figure 13:
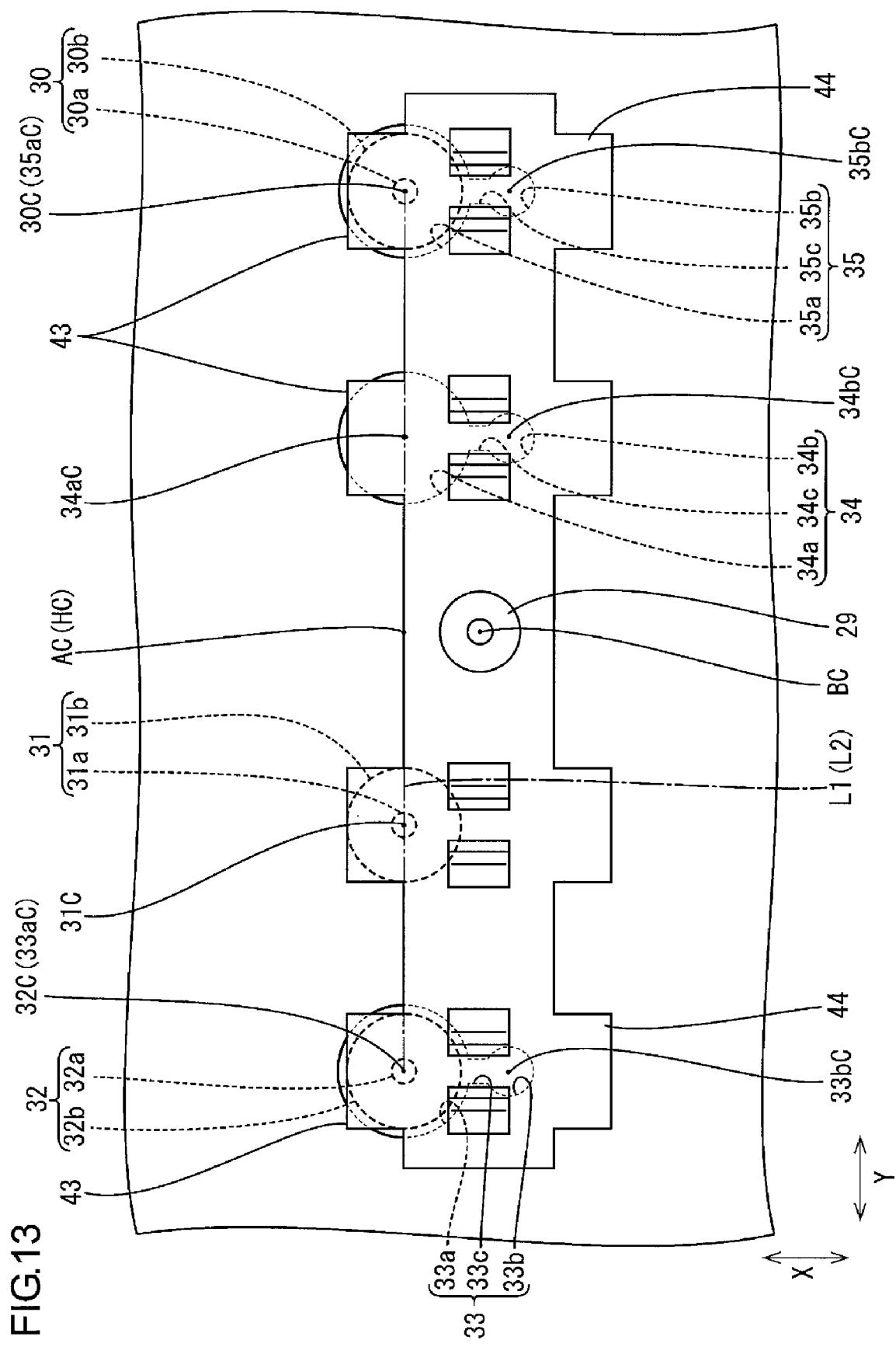
FIG. 13 is a plan view illustrating second mounting portions misaligned with second mounting holes.
Figure 14:
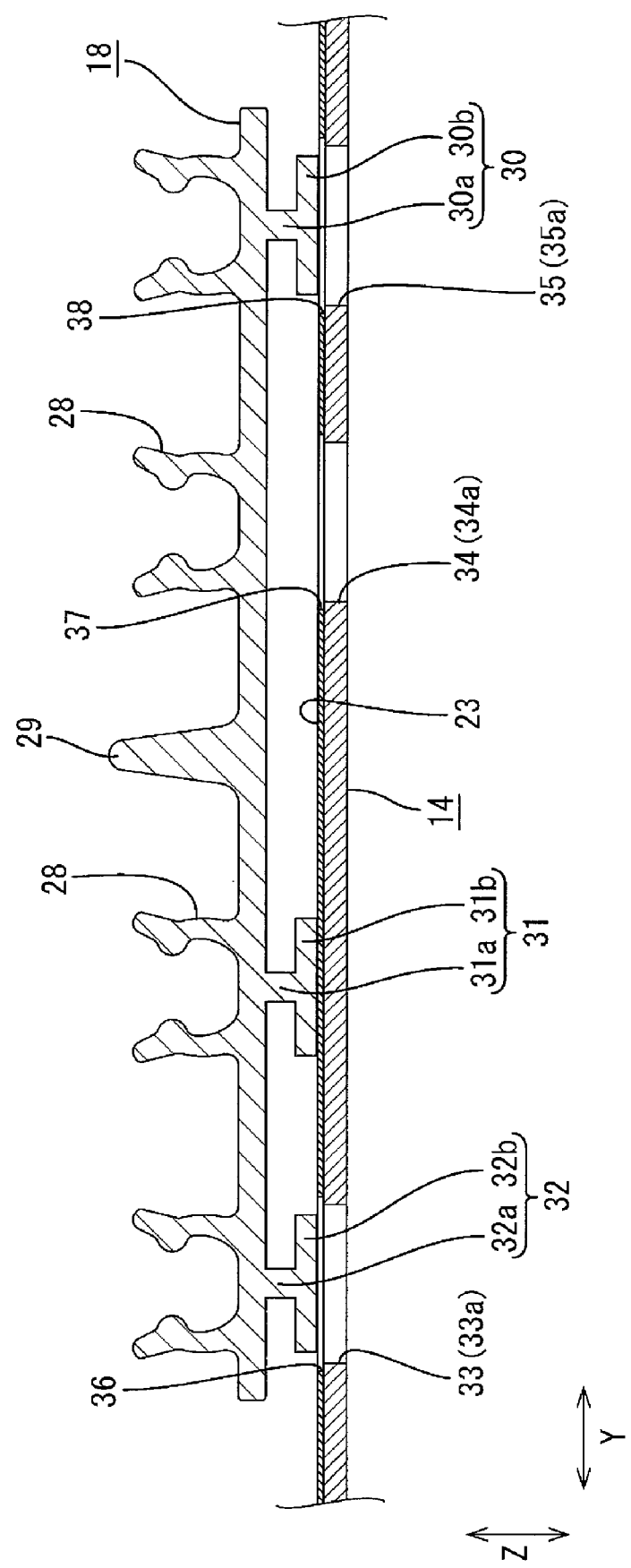
FIG. 14 is a plan view illustrating the second mounting portions interfering a reflection sheet when they are misaligned with the second mounting holes.

A case where the lamp clip 18 is in the second mounting condition in which the lamp clip 18 is placed on the other way around from the first mounting condition will be described. As illustrated in FIG. 13, even when the first mounting portion 30 and the third mounting portion 32 among the mounting portions 30 to 32 of the lamp clip 18 in the second mounting condition are conformed to the first mounting hole 33 and third mounting hole 35, the second mounting portion 31 does not conform to the second mounting hole 34. Therefore, when attempting to push the lamp clip 18 into the chassis 14, as illustrated in FIG. 14, the second mounting portion 31 is not inserted into the second mounting hole 34 and butts into (interferes with) the reflection sheet 23 covering the surface of the chassis 14. Accordingly, mounting of the lamp clip 18 in the second state to the chassis 14 can be restricted.

Meanwhile, there is a risk that a problem described below may occur when mounting of the lamp clip 18 in the second state is to be allowed. A description thereof will now be given with reference to FIG. 13. Hypothetically, when the mounting portions 30 to 32 of the lamp clip 18 in the second state are inadvertently inserted into the mounting holes 33 to 35, the second projecting portion 44 and the main body 27 are to be arranged on the side of the small diameter portions 33b to 35b with respect to the centers 33aC to 35aC of the large diameter portions 33a to 35a of the mounting holes 33 to 35 or, in other words, arranged frontward in the direction of sliding accompanying mounting. Therefore, when the lamp clip 18 is slid to mount the same, while the small diameter portions 33b to 35b of the mounting holes 33 to 35 are to be closed by the first projecting portions 43, the second projecting portion 44 and the main body 27 hardly contribute to closing the mounting holes 33 to 35. As a result, a major part of the large diameter portions 33a to 35a is opened (exposed) to the inside of the chassis 14. When the liquid crystal display device 10 is assembled and an image is displayed on the liquid crystal panel 11 while turning on the cold cathode tube 17 in this state, problems may occur in that the large diameter portions 33a to 35a of the exposed mounting holes 33 to 35 become visually recognized as dark spaces and light leaks to the rear side of the chassis 14 through the large diameter portions 33a to 35a of the exposed mounting holes 33 to 35.

Conversely, since the present embodiment restricts the lamp clip 18 from being erroneously mounted in the second state where the mounting holes 33 to 35 are not closed and allows mounting of the lamp clip 18 only in the first state where the mounting holes 33 to 35 are closed, all of the mounting holes 33 to 35 can be reliably closed by the lamp clip 18. As a result, the dark spots on the liquid crystal panel 11 are less likely to be present or and leakage of light is properly reduced.

In this case, when mounting the lamp clip 18 onto the chassis 14, for example, a state where the mounting portions 30 to 32 are displaced from the mounting holes 33 to 35 in an alignment direction thereof or, in other words, a direction perpendicular to the sliding direction (a direction perpendicular to the protruding direction of the mounting portions 30 to 32) is conceivable as a case where the mounting portions 30 to 32 do not conform to the mounting holes 33 to 35. Specifically, a case may be sited where the second mounting portion 31 is aligned with the first mounting hole 33 and the third mounting portion 32 is aligned with the second mounting hole 34 and, as a result, the first mounting portion 30 becomes inconsistent with the third mounting hole 35 (refer to FIGS. 5 and 9). However, in this case, since the inconsistent mounting holes 33 to 35 are not covered by the lamp clip 18 and therefore become visually recognizable in addition to the occurrence of a displacement of both end positions in the long-side direction of the main body 27 as compared to a normal case (FIG. 11), a worker can relatively easily notice that the lamp clip 18 is in a state that differs from a normal state. Meanwhile, when attempting to mount the lamp clip 18 in the second state that is an 180-degree rotation around the midpoint AC from the first state that is the normal state, as illustrated in FIG. 13, positions of both ends in the long-side direction (the alignment direction of the mounting portions 30 to 32) of the main body 27 becomes the same as in the first state and is therefore difficult to distinguish and the inconsistent mounting holes 33 to 35 are covered by the lamp clip 18. As a result, a worker is less likely to notice that the lamp clip 18 is in a state that differs from a normal state and mounting in an erroneous state is more likely to occur. From such perspectives, the technical significance of being able to reliably mount the lamp clip 18 in a predetermined state with respect to a rotational direction around the midpoint AC can be described as enormous.

The chassis assembly CA is assembled by mounting the lamp clips 18 onto the chassis 14 in the first state as described above. Next, the cold cathode tubes 17 are housed in the chassis 14 and mounted onto the lamp gripping portions 28, and the holder 20 is subsequently mounted. The diffuser plate 15a and the optical sheets 15b are then laminated and set, and the backlight unit 12 is assembled. Then, after further placing the liquid crystal panel 11 from the front side of the backlight unit 12, the bezel 13 is assembled to complete the assembly of the liquid crystal display device 10.

As described above, the chassis assembly according to the present embodiment includes: the chassis 14 whose mounting holes 33 to 35 are provided opened; and a lamp clip 18 including the main body 27 mounted to the chassis 14, the lamp gripping portion 28 provided on the main body 27 capable of gripping the cold cathode tube 17, and mounting portions 30 to 32 protruding from the main body 27 towards the side of the chassis 14 to be inserted into the mounting holes 33 to 25 and capable of holding rims of the mounting holes 33 to 35 between the main body 27, wherein three mounting portions 30 to 32 and three mounting holes 33 to 35 are to be provided and arranged in relative positions so as to restrict mounting of the lamp clip 18 to the chassis 14 in an orientation other than a predefined orientation.

Accordingly, when mounting the lamp clip 18 to the chassis 14, if the lamp clip 18 is in a predetermined state, such a configuration causes the mounting portions 30 to 32 to be inserted into the mounting holes 33 to 35 and a rim of the mounting holes 33 to 35 to be held between the main body 27 and the mounting portions 30 to 32. As a result, the lamp clip 18 can be mounted. On the other hand, since the mounting portions 30 to 32 and the mounting holes 33 to 35 are arranged in relative positions so as to restrict mounting of the lamp clip 18 to the chassis 14 in an orientation other than a predefined orientation, the lamp clip 18 is less likely to be mounted to the chassis 14 in an orientation other than the predefined orientation.

The mounting portions 30 to 32 and the mounting holes 33 to 35 are arranged so as to restrict mounting of the lamp clip 18 to the chassis 14 in an orientation other than a predefined orientation among orientations that are different from each other by a predefined angle around a predefined axis. Such a configuration enables the lamp clip 18 to be reliably mounted to the chassis 14 in a predetermined state with respect to a rotational direction around the predetermined point.

Furthermore, the mounting portions 30 to 32 and the mounting holes 33 to 35 are linearly arranged, respectively. Such a configuration enables configurations of the lamp clip 18 and the chassis 14 to be simplified.

Furthermore, the mounting portions 30 to 32 are arranged asymmetrically with respect to the midpoint AC between the outermost mounting portions 30 and 32. The mounting holes 33 to 35 are arranged asymmetrically with respect to the midpoint HC between the outermost mounting holes 33 and 35. While such a configuration enables the lamp clip 18 to assume two states that are 180-degree rotations from each other around the midpoint AC between the pair of mounting portions 30 and 32 arranged at both ends when the lamp clip 18 is to be mounted in a state where the pair of mounting portions 30 and 32 arranged at both ends corresponds to the pair of mounting holes 33 and 35 arranged at both ends, all of the mounting portions 30 to 32 will not conform to the mounting holes 33 to 35 unless one of the states is assumed. Therefore, the lamp clip 18 can be reliably mounted in a predetermined state with respect to a rotational direction around the midpoint AC. In addition, while the two states of the lamp clip 18 that are 180-degree rotations from each other are difficult to distinguish from one another because positions of both ends in an alignment direction of the mounting portions 30 to 32 of the main body 27 or, in other words, positions of both ends in the long-side direction of the main body 27 forming a rectangular shape are the same, the present configuration is further useful because mounting in a state that differs from a predetermined state is to be restricted as described above.

In addition, the mounting portions 30 to 32 include base portions 30a to 32a protruding from the main body 27 to the side of the chassis 14 and extending portions 30b to 32b protruding from the base portions 30a to 32a in a direction along the main body 27. In this case, the extending portions 30b to 32b are configured so as to be able to hold rims of the mounting holes 33 to 35 between the main body 27 when slid in a direction along the main body 27 from a state where the extending portions 30b to 32b are inserted into the mounting holes 33 to 35. Such a configuration causes the lamp clip 18 to become suitable for mounting by sliding the lamp clip 18 towards the chassis 14.

Furthermore, the main body 27 has a rectangular shape, a short-side direction of which is defined so as to match the sliding direction of the lamp clip 18 to cover the mounting holes 33 to 35. Such a configuration enables the main body 27 to cover the mounting holes 33 to 35 by sliding the lamp clip 18 along the short-side direction of the main body 27 and thus the mounting holes 33 to 35 are not open.

Moreover, the mounting portions 30 to 32 are arranged off a center of the main body 27 in the short-side direction. The mounting holes 33 to 35 are covered by a portion of the main body 27 closer to the center in the short-side direction than the mounting portions 30 to 32. Compared to a hypothetical case where the mounting portions are arranged at the center of the short-side direction of the main body 27, the main body 27 can be downsized in the short-side direction by precisely the amount of displacement of the mounting portions 30 to 32 from the center.

The main body 27 includes projecting portions 43 and 44 that project in a direction from the center of the main body 27 toward the respective mounting portions 30 to 32 in the short-side direction. The mounting portions 30 to 32 are provided on the respective projecting portions 43 and 44. Because of such a configuration, a surface area of the lamp clip 18 can be reduced in comparison to a lamp clip including a main body with a wide overall area. As a result, luminance unevenness and material cost are preferably reduced.

The main body 27 further includes the second projecting portions 44 that project in a direction from the mounting portions 30 to 32 toward the center side of the short-side direction. The second projecting portions 44 cover the respective mounting holes 33 to 35. Because of such a configuration, the surface area of the lamp clip 18 can be further reduced in comparison to the lamp clip including the main body with the wide overall area. As a result, luminance unevenness and material cost are more preferably reduced.

Furthermore, the extending portions 30b to 32b have a flange shape. Such a configuration enables a sufficient holding area of the rim of the mounting holes 33 to 35 to be held between the extending portions 30b to 32b and the main body 27 to be secured and a favorable mounted state of the lamp clip 18 to be maintained.

Second Embodiment

A second embodiment of the present invention will be described with reference to FIG. 15 or 16. In the present second embodiment, a configuration will be presented where arrangements of the mounting portions 30-A to 32-A and mounting holes 33-A to 35-A have been changed. Moreover, in the present second embodiment, parts with the same names as in the first embodiment described above will be denoted using the same reference characters and by adding a suffix -A, and redundant descriptions on structures, operations, and effects will be omitted.

Figure 15:
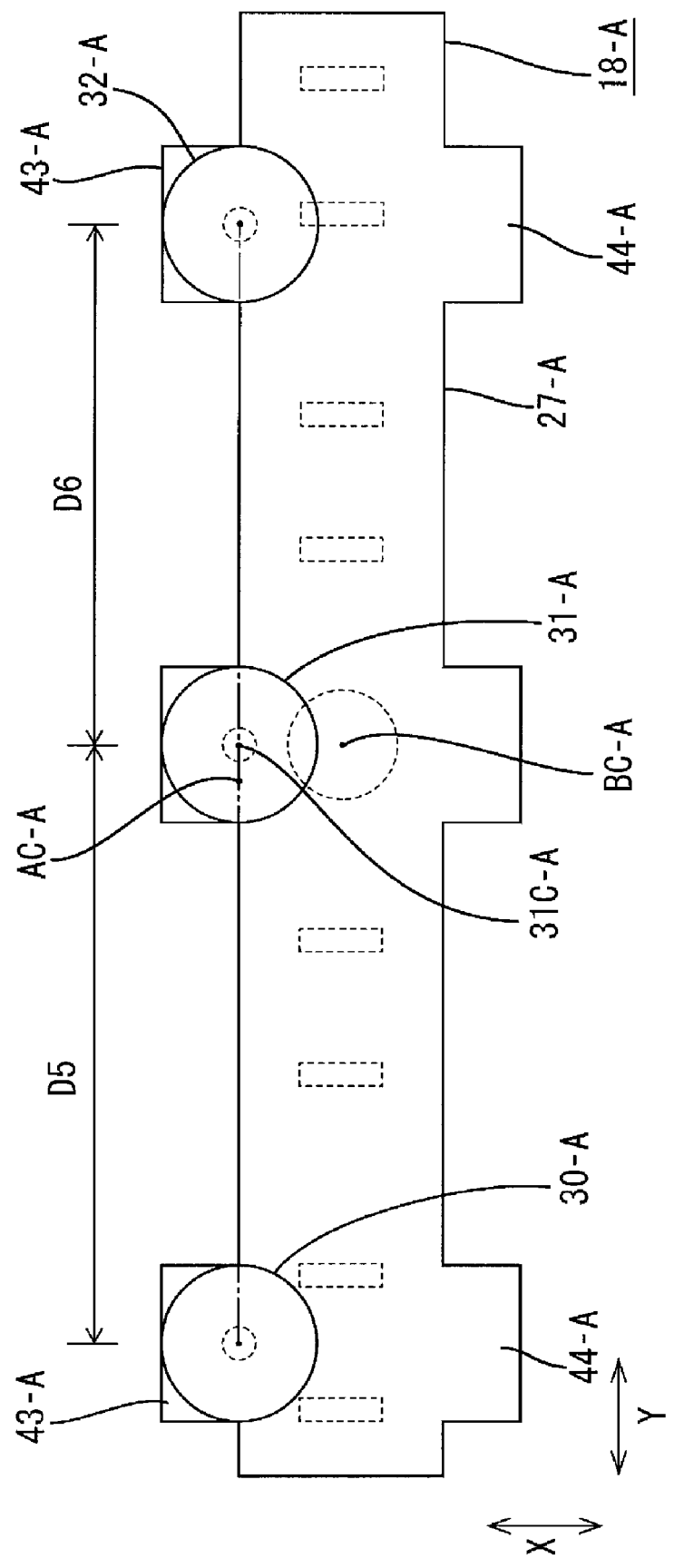
FIG. 15 is a bottom view of a lamp clip according to a second embodiment of the present invention.

As illustrated in FIG. 15, a second mounting portion 31-A among the mounting portions 30-A to 32-A is arranged at the center of the long-side direction of a main body 27-A. The second mounting portion 31-A is arranged at a position where a center 31C-A of the second mounting portion 31-A is consistent with a midpoint BC-A of the main body 27-A with respect to the long-side direction. On the other hand, a first mounting portion 30-A and a third mounting portion 32-A are arranged at positions such that a distance D5 between the first mounting portion 30-A and the second mounting portion 31-A differs from a distance D6 between the second mounting portion 31-A and the third mounting portion 32-A. In addition, the mounting portions 30A to 32A are arranged at positions asymmetrical with respect to a midpoint AC-A between the first mounting portion 30-A and the third mounting portion 32-A having the greatest distance among the distances of the mounting portions 30-A to 32-A and arranged at both ends. Furthermore, the midpoint AC-A is set to a position displaced from the midpoint BC-A of the main body 27-A with respect to the long-side direction of the main body 27-A. Moreover, three each of the first projecting portion 43-A and the second projecting portion 44-A are arranged at positions corresponding to the mounting portions 30-A to 32-A.

Figure 16:
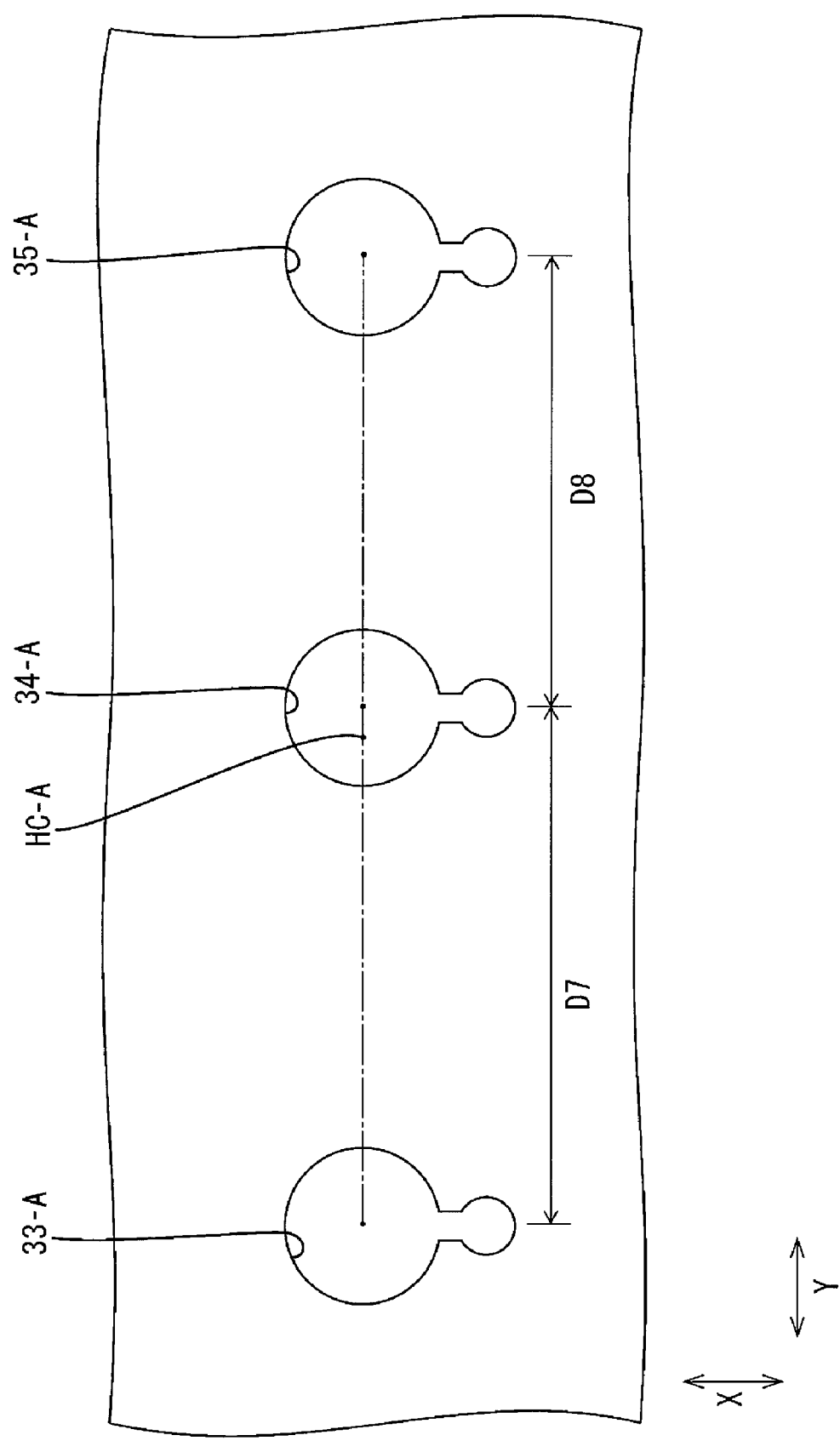
FIG. 16 is a magnified plan view of a chassis around mounting holes.

On the other hand, as illustrated in FIG. 16, the mounting holes 33-A to 35-A are arranged at positions such that a distance D7 between a first mounting hole 33-A and a second mounting hole 34-A is approximately consistent with the distance D5 between the first mounting portion 30-A and the second mounting portion 31-A, a distance D8 between the second mounting hole 34-A and a third mounting hole 35-A is approximately consistent with the distance D6 between the second mounting portion 31-A and the third mounting portion 32-A, and the distances D7 and D8 differ from each other. In addition, the mounting holes 33A to 35A are arranged at positions asymmetrical with respect to a midpoint HC-A between the first mounting hole 33-A and the third mounting hole 35-A having the greatest distance among the distances between the mounting holes 33-A to 35-A and arranged at both ends.

According to the configuration described above, mounting of the lamp clip 18-A is only allowed in a state where the mounting portions 30-A to 32-A are all conformed to the mounting holes 33-A to 35-A among the two states that are 180-degree rotations of the lamp clip 18-A around the midpoint AC-A.

Third Embodiment

A third embodiment of the present invention will be described with reference to FIG. 17 or 18. In the present third embodiment, a configuration will be presented where arrangements of mounting portions 30-B to 32-B and mounting holes 33-B to 35-B have been further modified. Moreover, in the present third embodiment, parts with the same names as in the first embodiment described above will be denoted using the same reference characters and by adding a suffix -B, and redundant descriptions on structures, operations, and effects will be omitted.

Figure 17:
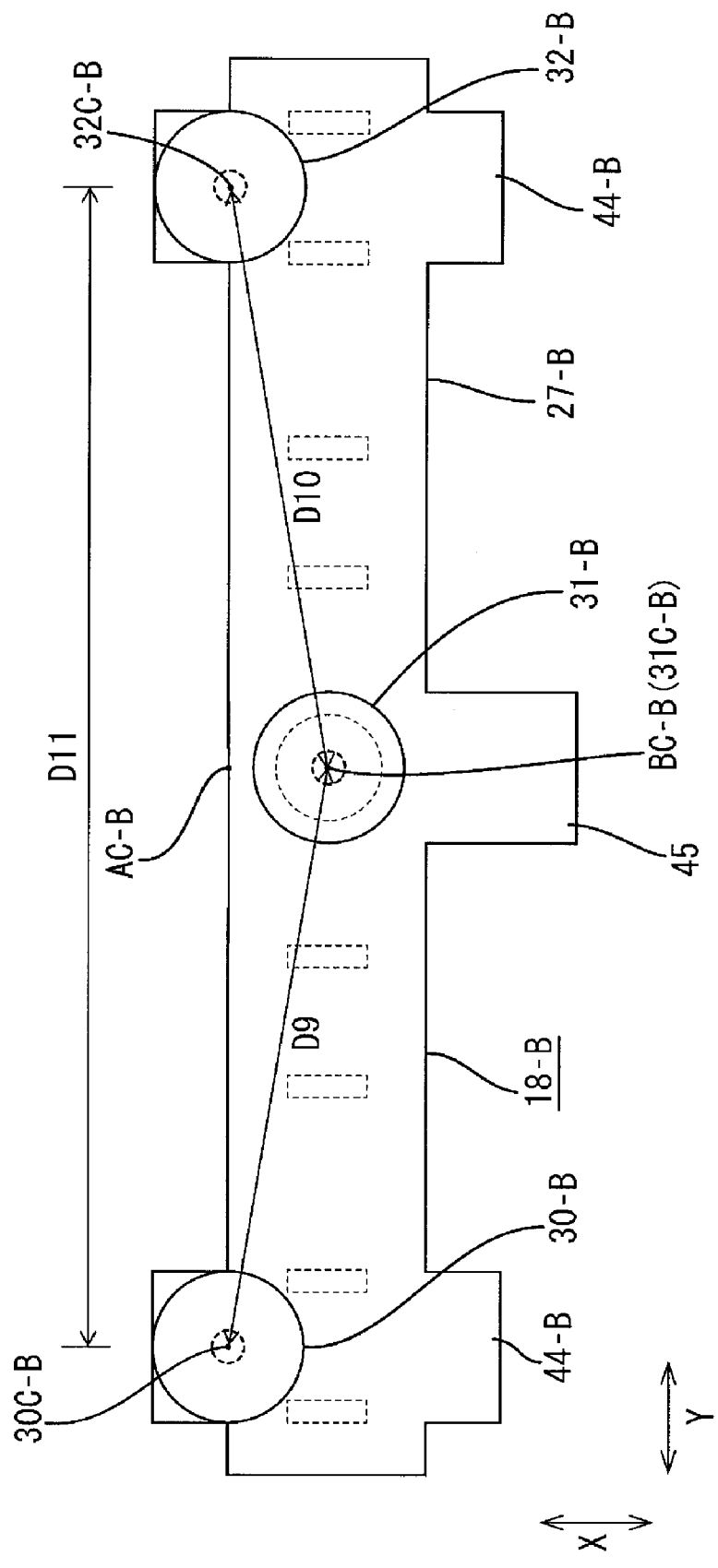
FIG. 17 is a bottom view of a lamp clip according to a third embodiment of the present invention.

As illustrated in FIG. 17, the mounting portions 30-B to 32-B are arranged nonlinearly in a main body 27-B. Specifically, while a first mounting portion 30-B and a third mounting portion 32-B are arranged at positions (eccentric positions) displaced in a short-side direction from the center of the short-side direction of the main body 27-B, a second mounting portion 31-B is arranged at a position concentric with a midpoint BC-B of the main body 27-B. In other words, the first mounting portion 30-B and the third mounting portion 32-B are arranged at positions displaced in the short-side direction (sliding direction) of the main body 27-B with respect to the second mounting portion 31-B, and the three mounting portions are in a nonlinear arrangement. An isosceles triangle can be drawn by connecting centers 30C-B to 32C-B of the mounting portions 30-B to 32-B with lines.

A distance D9 between the first mounting portion 30-B and the second mounting portion 31-B is set approximately equal to a distance D10 between the second mounting portion 31-B and the third mounting portion 32-B. In comparison, a distance D11 between the first mounting portion 30-B and the third mounting portion 32-B positioned at both ends in a long-side direction of the main body 27-B is set greater than the aforementioned distances D9 and D10 and is therefore the greatest distance. In addition, the mounting portions 30-B to 32-B are arranged at positions asymmetrical with respect to a midpoint AC-B between the first mounting portion 30-B and the third mounting portion 32-B constituting the greatest distance D11. This is apparent from the fact that the second mounting portion 31-B is arranged at a position separated by a predetermined distance from the midpoint AC-B and a mounting portion does not exist at a position that is point-symmetrical to the second mounting portion 31-B with respect to the midpoint AC-B.

Furthermore, a projecting portion 45 protruding rearward is provided at a position corresponding to the second mounting portion 31-B in the long-side direction among a rear end of the main body 27-B. The projecting portion 45 has a greater protruding size than a second projecting portion 44-B and a difference between the protruding sizes thereof is approximately equal to the displacement of the second mounting portion 31-B with respect to the first mounting portion 30-B and the third mounting portion 32-B. Accordingly, when a lamp clip 18-B is mounted to the chassis 14-B, the second mounting hole 34-B corresponding to the projecting portion 45 can be closed by the same.

Figure 18:
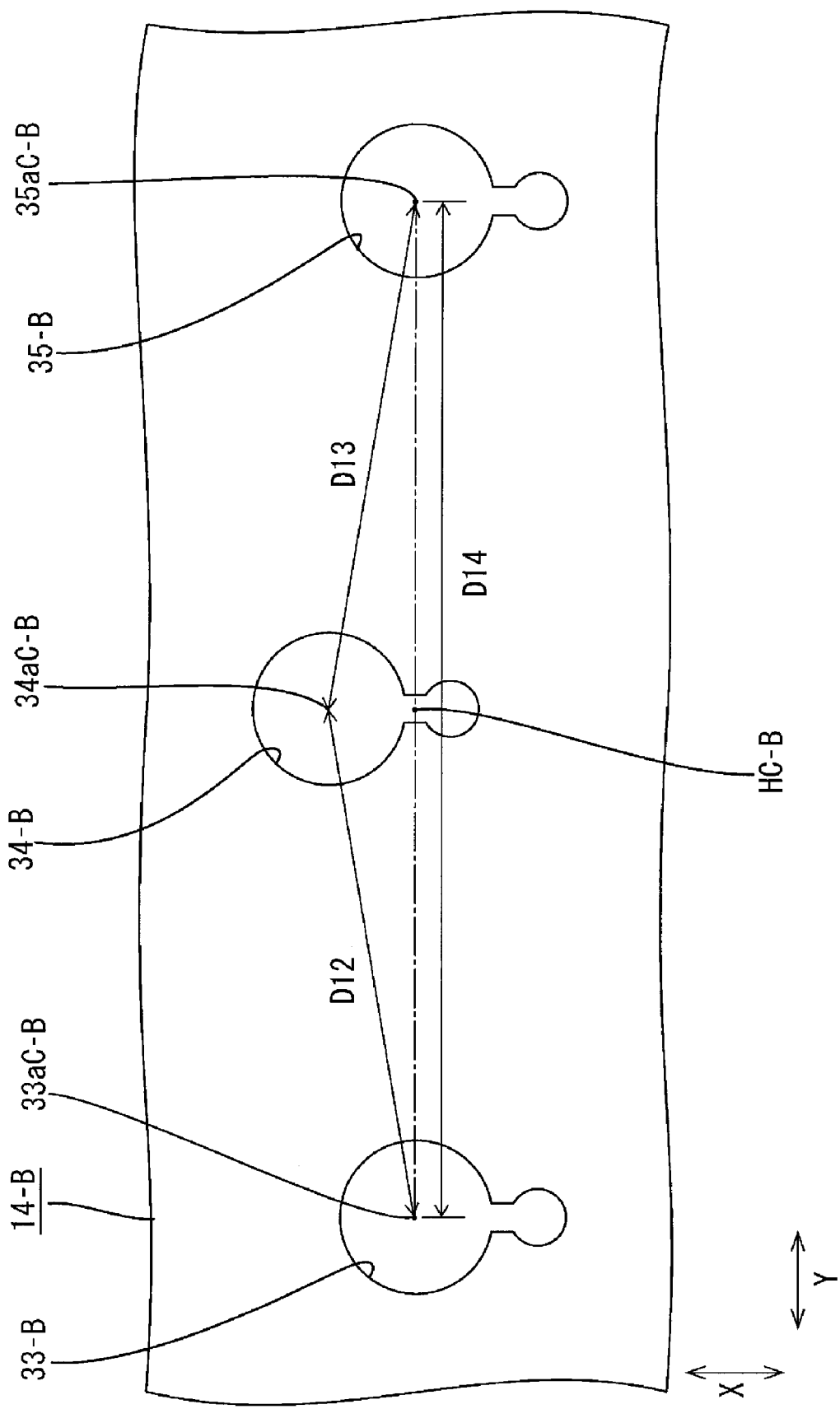
FIG. 18 is a magnified plan view of a chassis around mounting holes.

On the other hand, as illustrated in FIG. 18, the mounting holes 33-B to 35-B are arranged nonlinearly on the chassis 14-B in the same manner as the mounting portions 30-B to 32-B. Specifically, a second mounting hole 34-B is arranged at a position displaced in the long-side direction (sliding direction) of the chassis 14-B with respect to a first mounting hole 33-B and a third mounting hole 35-B, and an isosceles triangle can be drawn by connecting centers 33aC-B to 35aC-B of the mounting holes 33-B to 35-B with lines. A distance D12 between the first mounting hole 33-B and the second mounting hole 34-B is set approximately equal to a distance D13 between the second mounting hole 34-B and the third mounting hole 35-B as well as distances D9 between the first mounting portion 30-B and the second mounting portion 31-B and D10 between the second mounting portion 31-B and the third mounting portion 32-B. In comparison, a distance D14 between the first mounting hole 33-B and the third mounting hole 35-B positioned at both ends in a short-side direction of the chassis 14-B is set greater than the aforementioned distances D12 and D13 and is therefore the greatest distance. In addition, the mounting holes 33-B to 35-B are arranged at positions asymmetrical with respect to a midpoint HC-B between the first mounting hole 33-B and the third mounting hole 35-B constituting the greatest distance D14. This is apparent from the fact that the second mounting hole 34-B is arranged at a position separated by a predetermined distance from the midpoint HC-B and a mounting hole does not exist at a position that is point-symmetrical to the second mounting hole 34-B with respect to the midpoint HC-B.

When the lamp clip 18-B is to be mounted onto the chassis 14-B in a state where the first mounting portion 30-B and the third mounting portion 32-B are conformed to the first mounting hole 33-B and the third mounting hole 35-B, the lamp clip 18-B may assume two states that are 180-degree rotations from each other around the midpoint AC-B. Among the two states, in the first state, since the mounting portions 30-B to 32-B all conform to the mounting holes 33-B to 35-B, the mounting portions 30-B to 32-B can be inserted into the mounting holes 33-B to 35-B and mounting is to be allowed. On the other hand, in the second state, since the second mounting portion 31-B does not conform to the second mounting hole 34-B, mounting is to be restricted.

As described above, according to the present embodiment, the mounting portions 30-B to 32-B and the mounting holes 33-B to 35-B are respectively nonlinearly arranged. Such a configuration can favorably restrict the lamp clip 18-B from being mounted in a state that differs from a predetermined state.

In addition, the mounting portions 30-B to 32-B are arranged such that distances of different sizes exist among the distances between the mounting portions 30-B to 32-B and the mounting holes 33-B to 35-B are arranged such that distances of different sizes exist among the distances between the mounting holes 33-B to 35-B. The mounting portions 30-B to 32-B are arranged at positions asymmetrical with respect to the midpoint AC-B between the pair of mounting portions 30-B and 32-B having the greatest distance, and the mounting holes 33-B to 35-B are arranged at positions asymmetrical with respect to the midpoint HC-B between the pair of mounting holes 33-B and 35-B having the greatest distance.

Due to such a configuration, while the lamp clip 18-B can assume two states that are 180-degree rotations from each other around the midpoint AC-B between the pair of mounting portions 30-B and 32-B having the greatest distance when the lamp clip 18-B is to be mounted in a state where the pair of mounting portions 30-B and 32-B whose distance is greatest among the distances between the mounting portions 30-B to 32-B is conformed to the pair of mounting holes 33-B and 35-B whose distance is greatest among the distances between the mounting holes 33-B to 35-B, all of the mounting portions 30-B to 32-B cannot be conformed to the mounting holes 33-B to 35-B unless one of the two states is assumed. Therefore, the lamp clip 18-B can be reliably mounted in a predetermined state with respect to a rotational direction around the midpoint AC-B. In addition, while the two states of the lamp clip 18-B that are 180-degree rotations from each other are difficult to distinguish from one another because positions of both ends in an alignment direction of the pair of mounting portions 30-B and 32-B whose distance is greatest among the distances between the mounting portions 30-B to 32-B of the main body 27-B or, in other words, positions of both ends in the long-side direction of the main body 27-B forming a rectangular shape are the same, the present configuration is further useful because mounting in a state that differs from a predetermined state is to be restricted as described above.

Fourth Embodiment

A fourth embodiment of the present invention will be described with reference to FIGS. 19 to 21. In the present fourth embodiment, a configuration will be presented where an arrangement of a supporting pin 29-C and arrangements of lamp clips 18-C with respect to a chassis 14-C have been changed. Moreover, in the present fourth embodiment, parts with the same names as in the first embodiment described above will be denoted using the same reference characters and by adding a suffix -C, and redundant descriptions on structures, operations, and effects will be omitted.

Figure 19:
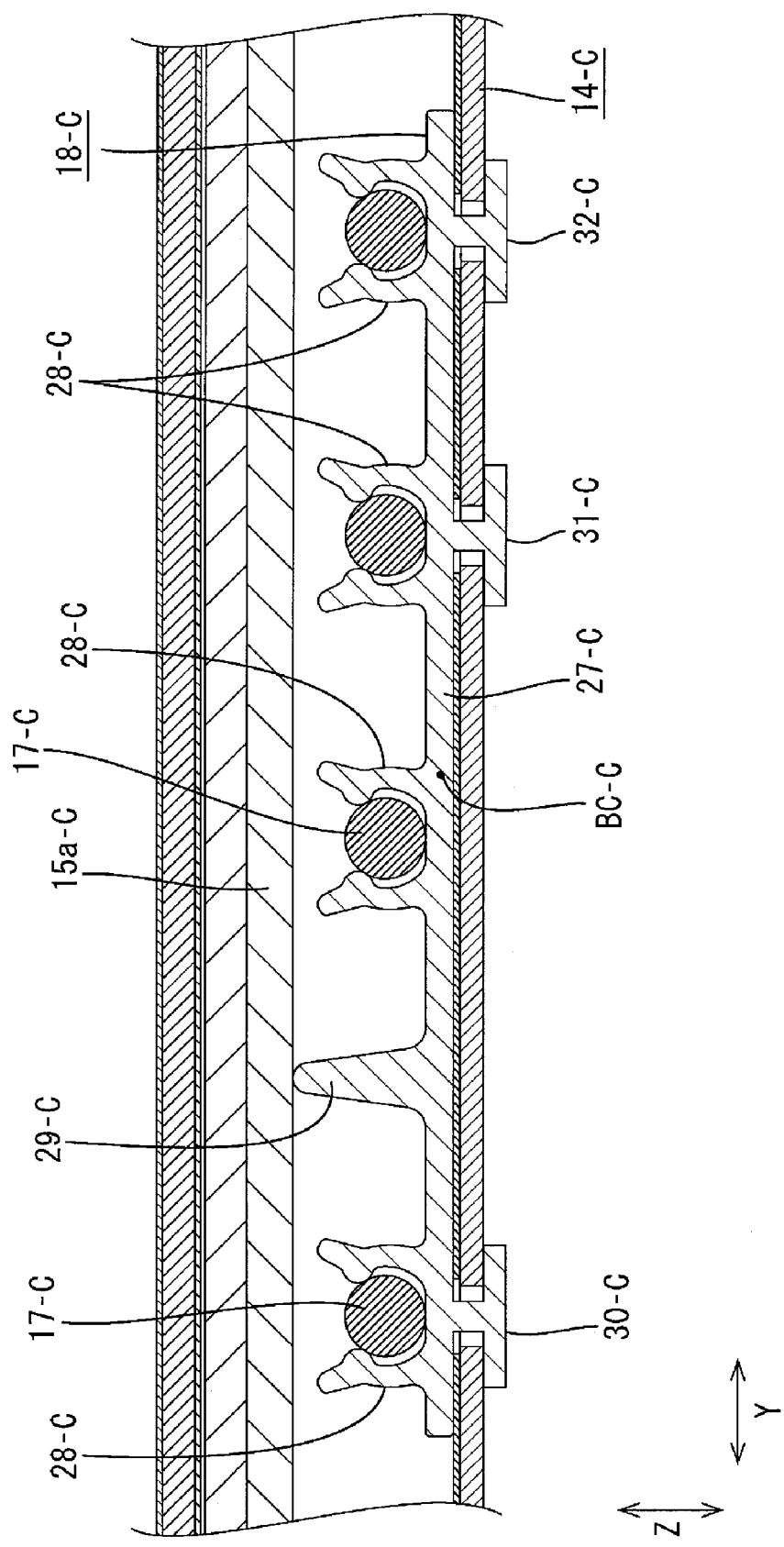
FIG. 19 is a cross-sectional view illustrating lamp clips mounted to a chassis according to a fourth embodiment of the present invention.
Figure 20:
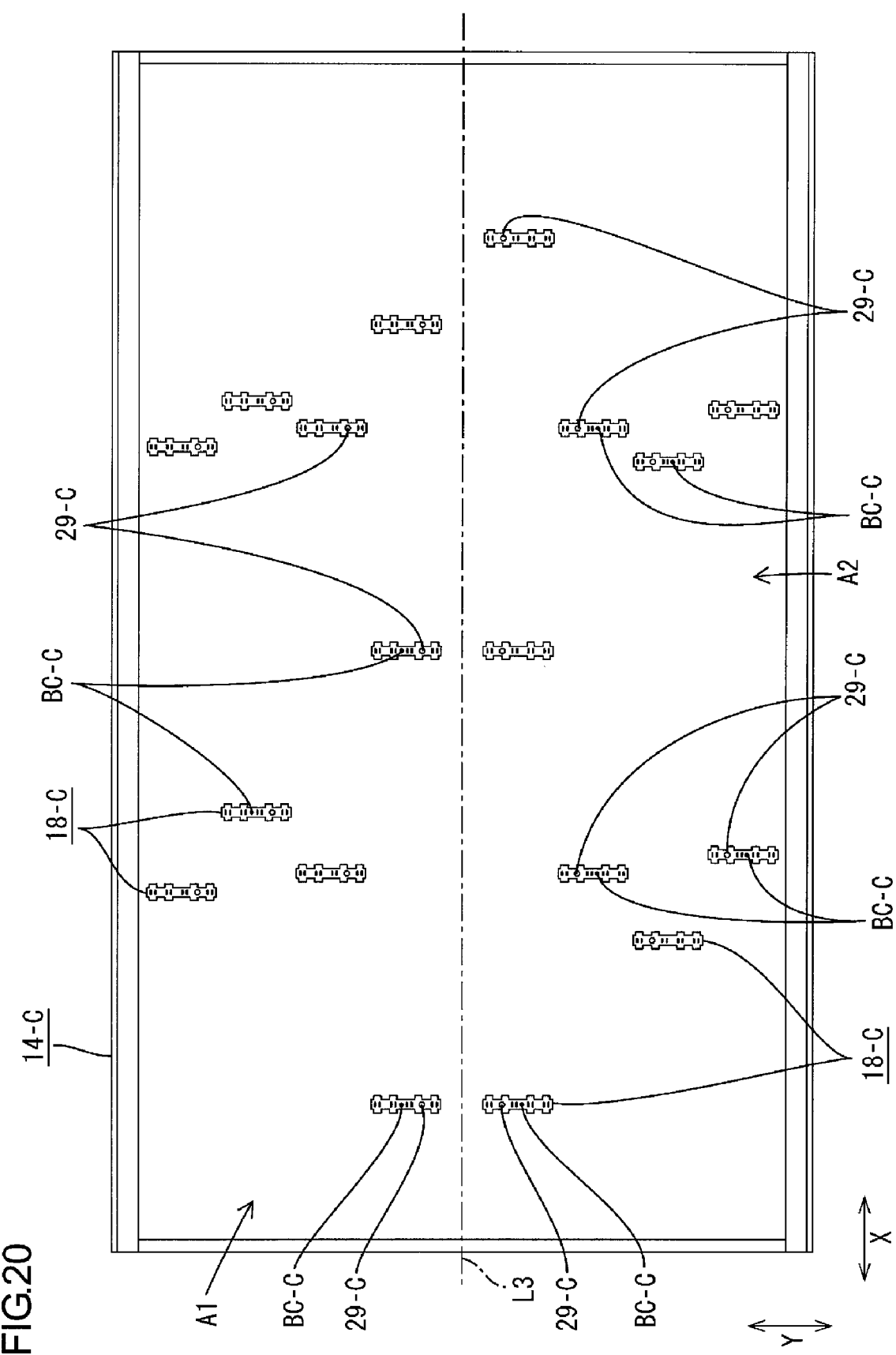
FIG. 20 is a plan view illustrating a lamp clip mounted to a chassis.
Figure 21:
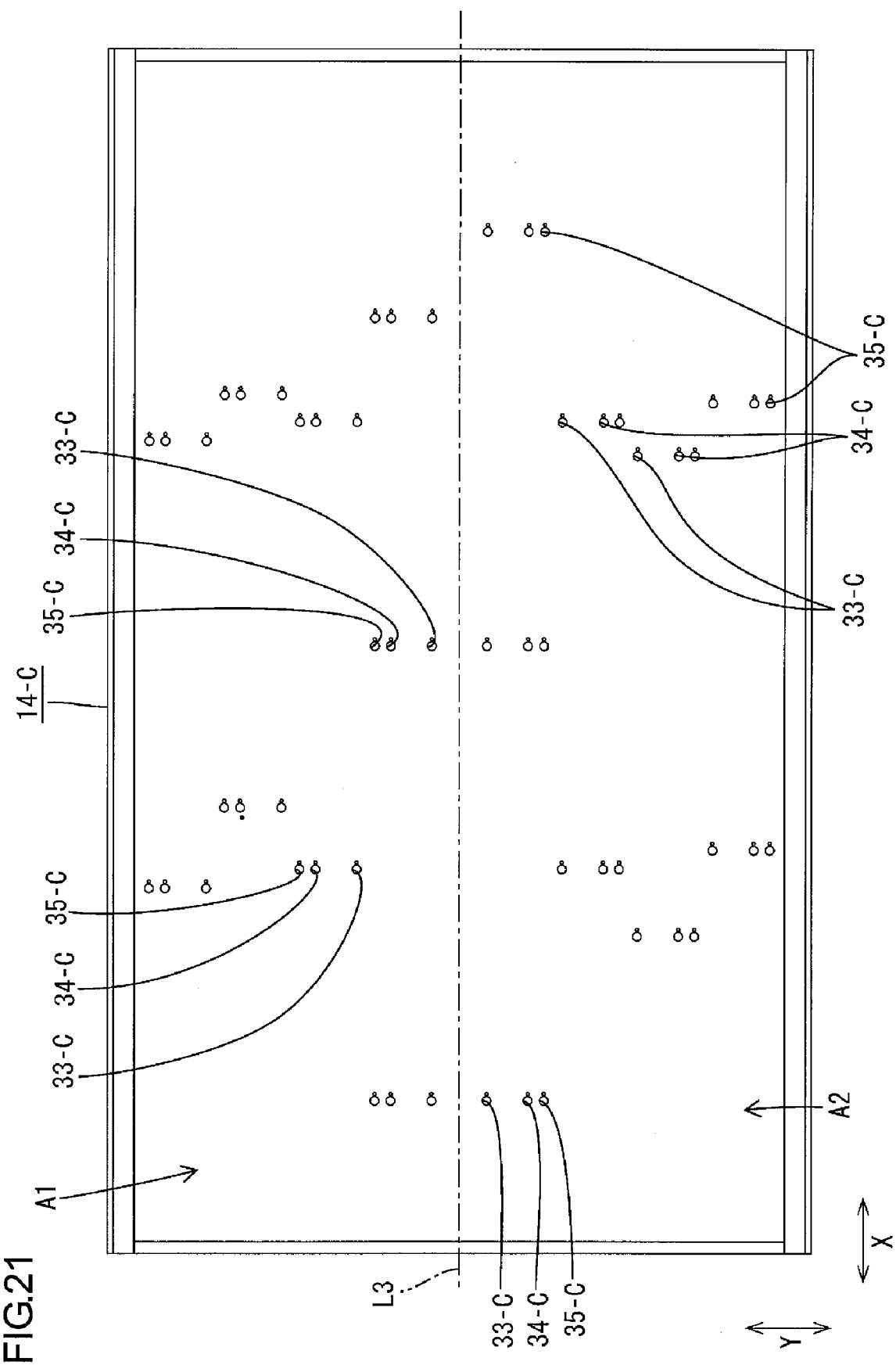
FIG. 21 is a plan view of the chassis.

As illustrated in FIGS. 19 and 20, the supporting pin 29-C is arranged at a position offset (displaced) from a midpoint BC-C of a main body 27-C or, in other words, an eccentric position. Specifically, the supporting pin 29-C is arranged at a position between a first mounting portion 30-C and a second mounting portion 31-C that is an intermediate position between a left-end lamp gripping portion 28-C and an adjacent lamp gripping portion 28-C as illustrated in FIG. 19.

Meanwhile, the lamp clips 18-C are arranged with respect to the chassis 14-C as follows. That is, as illustrated in FIG. 20, the lamp clips 18-C are mounted so that the supporting pins 29-C become eccentric to the side of the center of the short-side direction of the chassis 14-C or, more specifically, to the side of an imaginary reference line L3 that passes the central position and traverses along the long-side direction (the X-axis direction, a longitudinal direction of a cold cathode tube 17-C, a direction perpendicular to a longitudinal direction of the main body 27-C, a planar direction of a diffuser plate 15a-C).

Specifically, while the lamp clips 18-C are to be mounted in a state where the long-side direction of the main body 27-C is matched with the short-side direction of the chassis 14-C (the Y-axis direction, a direction perpendicular to the longitudinal direction of the cold cathode tube 17-C and to the reference line L3), since the supporting pin 29-C is arranged on each lamp clip 18-C at a position that is eccentric in the longitudinal direction of the main body 27-C, directionality is created in the mounting direction with respect to the chassis 14-C. Therefore, two mounting directions are set for the lamp clips 18-C, namely, a first mounting direction where the supporting pin 29-C faces downward as illustrated in FIG. 20 (first mounting posture, first mounted state) and a second mounting direction where the supporting pin 29-C faces upward in FIG. 20 which is an opposite direction to the first mounting direction (second mounting posture, second mounted state). In addition, the lamp clip 18-C to be mounted in a first area A1 on an upper side of the reference line L3 as illustrated in FIG. 20 on a bottom plate of the chassis 14-C is arranged in the first mounting direction, and the lamp clip 18-C to be mounted in a second area A2 on a lower side in FIG. 20 is arranged in the second mounting direction. In other words, the lamp clips 18-C are divided into a first lamp clip group set in the first mounting direction and a second lamp clip group on the other side of the reference line L3 (that is a border) and set in the second mounting direction, and the supporting pins 29-C eccentrically arranged at each main body 27-C are all arranged near the reference line L3.

In this state, distances from the reference line L3 to the supporting pin 29-C of the lamp clips 18-C are respectively smaller than distances from the reference line L3 to a midpoint BC-C of the main body 27-C of the lamp clips 18-C. Accordingly, the support position of each supporting pin 29-C with respect to the diffuser plate 15a-C becomes close to the center of the short-side direction of the diffuser plate 15a-C or, in other words, the nearer to the center of the short-side direction of the diffuser plate 15a-C, the higher the distribution density of the supporting pins 29-C. When a thermal expansion or a thermal contraction occurs on the diffuser plate 15a-C, due to structural characteristics, the nearer to the center of the screen, the more likely deflection or warpage to the side of the cold cathode tube 17-C occurs. However, since a large number of supporting pins 29-C is distributed near the center of the screen, deflection and warpage can be favorably regulated. Meanwhile, there is an optimum (minimum) number/arrangement of the lamp clips 18-C for supporting the cold cathode tube 17-C. During such an optimum predetermined arrangement, by arranging the lamp clips 18-C on which supporting pins 29-C have been eccentrically arranged such that the supporting pins 29-C approach the reference line L3, an effect of favorably regulating deflection and warpage of the diffuser plate 15a-C can be obtained.

In addition, the mounting holes 33-C to 35-C for mounting the lamp clips 18-C are arranged on the chassis 14-C as follows. That is, as illustrated in FIG. 21, the mounting holes 33-C to 35-C are arranged such that the first mounting hole 33-C is eccentrically located on the side of the reference line L3 on the chassis 14-C. Specifically, while the first mounting hole 33-C among the three mounting portions 30-C to 32-C is arranged on the lower side as illustrated in FIG. 21 in a first area A1 of the chassis 14-C, the first mounting hole 33-C among the three mounting portions 30-C to 32-C is arranged on the upper side in FIG. 21 in a second area. In addition, the distance from the reference line L3 to the first mounting hole 33-C is set respectively shorter than the distances from the reference line to the second mounting hole 34-C or the third mounting hole 35-C. Moreover, among the mounting holes 33-C to 35-C, the first mounting hole 33-C corresponds to the first mounting portion 30-C of the lamp clip 18-C. Since the first mounting portion 30-C is positioned in a direction from the midpoint BC-C of the main body 27-C towards the supporting pin 29-C among the mounting portions 30-C to 32-C, the first mounting hole 33-C can be described as being eccentrically located so as to correspond to the direction of eccentricity of the supporting pin 29-C.

As described above, according to the present embodiment, the planar diffuser plate 15a-C is arranged at a position where the lamp clip 18-C is interposed between the chassis 14-C, and the supporting pin 29-C capable of supporting the diffuser plate 15a-C is provided on the main body 27-C at an eccentric position. Such an arrangement enables the lamp clip 18-C having the supporting pin 29-C eccentrically arranged on the main body 27-C to be mounted onto the chassis 14-C in an appropriate state.

In addition, a plurality of lamp clips 18-C are mounted on the chassis 14-C. Each lamp clip 18-C is arranged such that a distance from a reference line L3 set along a planar direction of the diffuser plate 15a-C to the supporting pin 29-C is shorter than a distance from the reference line L3 to the midpoint BC-C of the main body 27-C. Due to such a configuration, since the lamp clips 18-C are arranged such that the supporting pins 29-C are eccentrically positioned on the main bodies 27-C and the distance from the reference line L3 set along a planar direction of the diffuser plate 15a-C to the supporting pins 29-C is shorter than a distance from the reference line L3 to the midpoint BC-C of the main body 27-C, the closer to the reference line L3, the greater the distribution density of the supporting pins 29-C in the plane of the diffuser plate 15a-C. In addition, by setting the reference line L3 at a position on the diffuser plate 15a-C where occurrences of deflection and warpage are a concern, the diffuser plate 15a-C can be favorably supported by the supporting pins 29-C and occurrences of deflection and warpage can be adequately reduced.

Fifth Embodiment

A fifth embodiment of the present invention will be described with reference to FIG. 22 or 23. In the present fifth embodiment, a configuration will be presented where the arrangement of lamp gripping portions 28-D at a lamp clip 18-D differs from the arrangement according to the fourth embodiment described above. Moreover, in the present fifth embodiment, parts with the same names as in the fourth embodiment described above will be denoted using the same reference characters and by adding a suffix -D, and redundant descriptions on structures, operations, and effects will be omitted.

Figure 22:
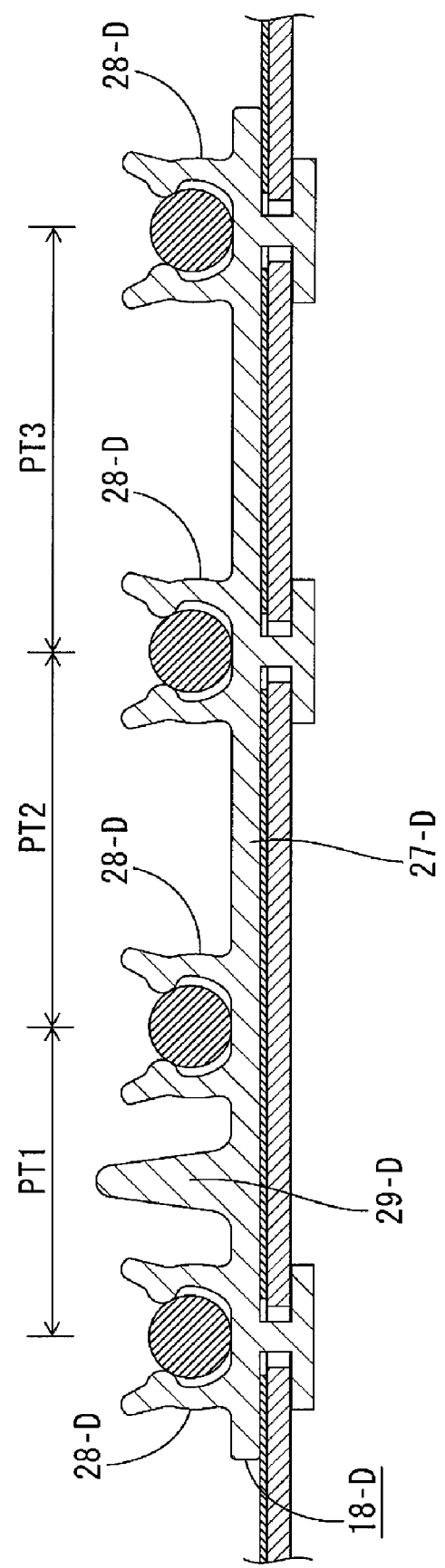
FIG. 22 is a cross-sectional view illustrating a lamp clip mounted to a chassis according to a fifth embodiment of the present invention.

As illustrated in FIG. 22, a plurality of (four) lamp gripping portions 28-D is arranged aligned at positions on the main body 27-D separated in a long-side direction thereof. Pitches (intervals) PT1 to PT3 between the lamp gripping portions 28-D are set so as to differ from each other. Specifically, the pitches between adjacent lamp gripping portions 28-D are set such that the pitch becomes smaller towards the end on the side of a supporting pin 29-D on the main body 27-D and becomes larger towards the end on the opposite side to the supporting pin 29-D. In other words, the distribution density of the lamp gripping portions 28-D on the lamp clip 18-D is set so that the closer to the side of the eccentrically arranged supporting pin 29-D, the higher the distribution density.

Figure 23:
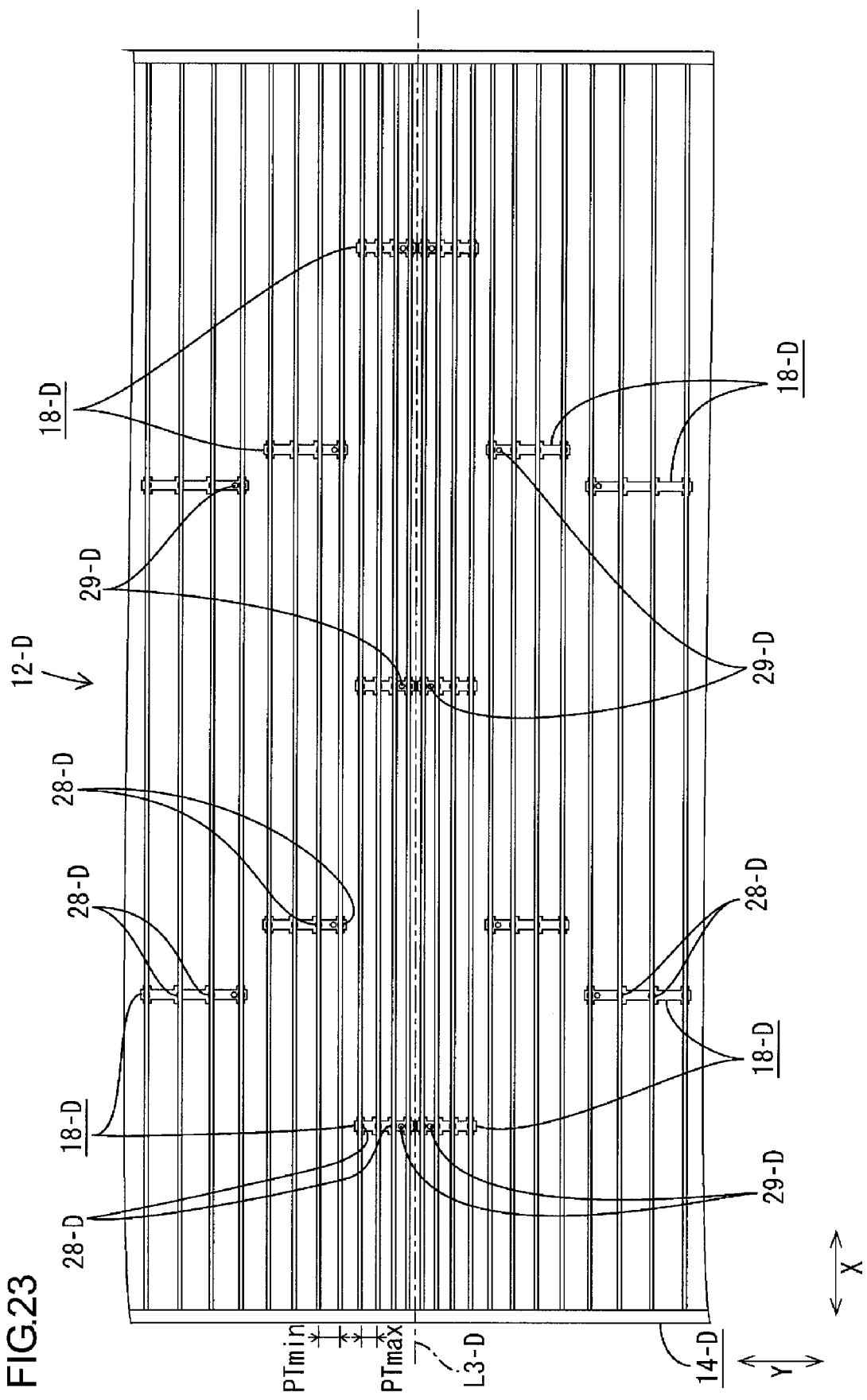
FIG. 23 is a plan view illustrating lamp clips and cold cathode tubes mounted to a chassis.

In addition, as illustrated in FIG. 23, a plurality of lamp clips 18-D structured as described above is mounted onto the chassis 14-D. The pitches PT1 to PT3 between the lamp gripping portions 28-D are set so as to differ from each other depending on where the lamp clips 18-D are mounted on the chassis 14-D. Specifically, a largest interval PTmax between lamp gripping portions 28-D at a lamp clip 18-D installed near a reference line L3-D on the chassis 14-D is set so as to be smaller than a smallest interval PTmin between lamp gripping portions 28-D at a lamp clip 18-D mounted further away from the reference line L3-D than the lamp clip 18-D. In other words, the distribution density of the lamp gripping portions 28-D on the chassis 14-D is set so that the closer to the side of the reference line L3-D, the higher the distribution density.

Due to such a design, when mounting cold cathode tubes 17-D onto the lamp gripping portions 28-D, the pitches between adjacent cold cathode tubes 17-D become irregular and the closer to the side of the reference line L3-D on the chassis 14-D, the higher the distribution density of the cold cathode tubes 17-D, and the closer to the sides of both ends, the lower the distribution density of the cold cathode tubes 17-D. Accordingly, the luminance near the center of a screen in a backlight unit 12-D can be improved and a diffuser plate can be favorably supported by the supporting pins 29-D arranged near the center of the screen.

As described above, according to the present embodiment, a plurality of cold cathode tubes 17-D are to be housed in the chassis 14-D, and the lamp clip 18-D is formed so as to include a plurality of lamp gripping portions 28-D, wherein each lamp gripping portion 28-D grips a different cold cathode tube 17-D and intervals between the lamp gripping portions 28-D differ from each other. Such a configuration enables mounting of the lamp clip 18-D to be restricted so that each lamp gripping portion 28-D is arranged at a position corresponding to an interval between cold cathode tubes 17-D to be housed in the chassis 14-D. As a result, each lamp gripping portion 28-D is able to reliably grip a corresponding cold cathode tube 17-D.

In addition, the cold cathode tubes 17-D are mounted such that the closer to the center of the chassis 14-D, the higher the distribution density of the cold cathode tubes 17-D, and a largest interval PTmax between lamp gripping portions 28-D at a lamp clip 18-D placed near the center of the chassis 14-D is set so as to be smaller than a smallest interval PTmin between lamp gripping portions 28-D at a lamp clip 18-D mounted closer to the ends of the chassis 14-D than the lamp clip 18-D. Such a configuration enables a high brightness to be obtained by increasing the distribution density of the cold cathode tubes 17-D closer to the center of the chassis 14-D. In addition, the cold cathode tubes 17-D arranged at irregular pitches can be favorably held by the lamp gripping portions 28-D of the lamp clips 18-D.

Sixth Embodiment

A sixth embodiment of the present invention will be described with reference to FIG. 24. In the present sixth embodiment, a configuration will be presented where structures of mounting portions 30-E to 32-E and mounting holes 33-E to 35-E have been changed. Moreover, in the present sixth embodiment, parts with the same names as in the first embodiment described above will be denoted using the same reference characters and by adding a suffix -E, and redundant descriptions on structures, operations, and effects will be omitted.

Figure 24:
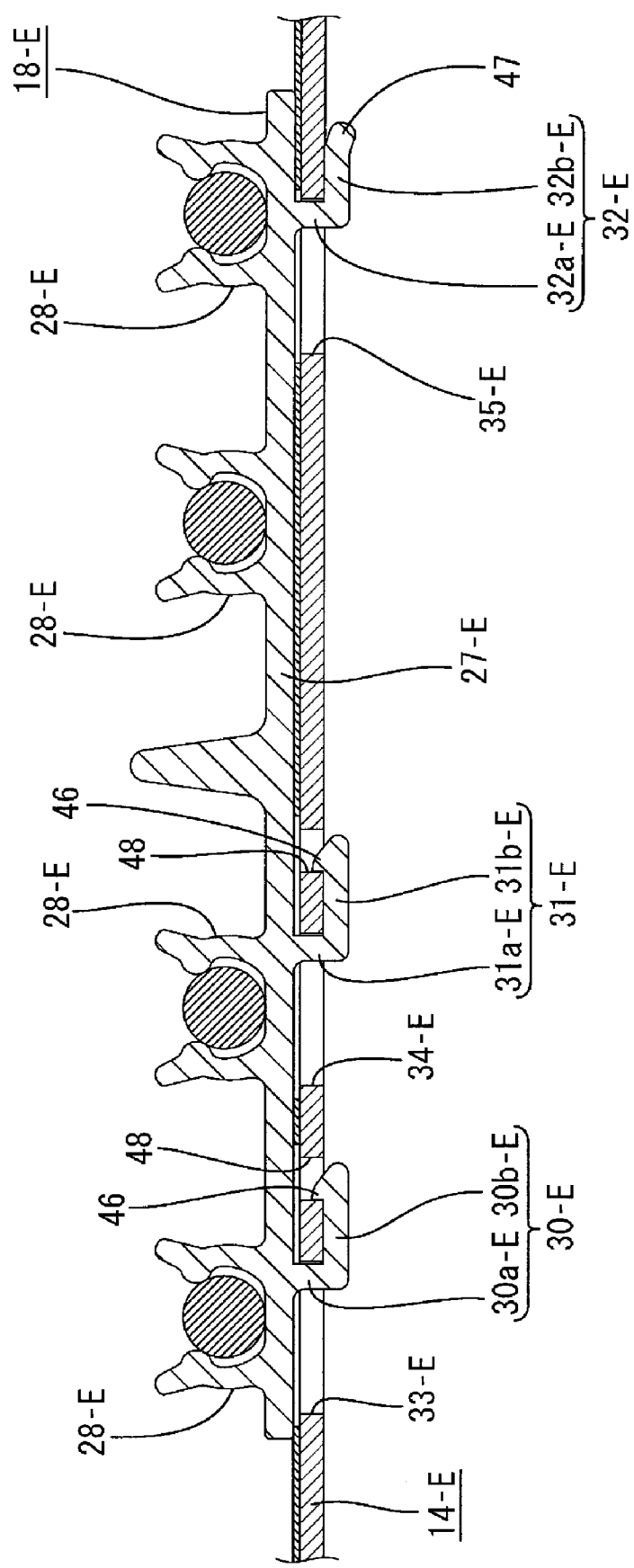
FIG. 24 is a cross-sectional view illustrating a lamp clip mounted to a chassis according to a sixth embodiment of the present invention.

As illustrated in FIG. 24, mounting portions 30-E to 32-E include base portions 30a-E to 32a-E that protrude from a rear surface of a main body 27-E and cantilevered extending portions 30b-E to 32b-E that protrude (extend) from distal ends of the respective base portions 30a-E to 32a-E along the longitudinal direction of the main body 27-E so as to form an about right angle. The base portions 30a-E to 32a-E and the respective extending portions 30b-E to 32b-E form a substantially L-shape as seen in plan view.

Among the mounting portions 30-E to 32-E, a first mounting portion 30-E and a second mounting portion 31-E include locking protrusions 46 that protrude from the distal ends of the extending portions 30b-E and 31b-E to the side of the main body 27-E. A tapered face is formed on faces of the locking protrusions 46 opposing the main body 27-E. Faces of the locking protrusions 46 opposing the base portions 30a-E and 31a-E are configured so as to be approximately parallel to outer faces of the base portions 30a-E and 31a-E and upright, and approximately straight along a direction (Z-axis direction) perpendicular to a sliding direction (Y-axis direction) of a lamp clip 18-E with respect to a chassis 14-E. The faces function as locking faces for the chassis 14-E.

In contrast, a third mounting portion 32-E among the mounting portions 30-E to 32-E is provided with a guide portion 47 capable of guiding a mounting operation of the chassis 14-E to a tip of the protrusion 32b-E. The guide portion 47 is formed so as to have an incline such that the further towards the tip, the more separated the guide portion 47 is from the main body 27-E.

On the other hand, the mounting holes 33-E to 35-E are formed to a size that allows insertion of the mounting portions 30-E to 32-E. The chassis 14-E has locking holes 48 adjacent to the first mounting hole 33-E and the second mounting hole 34-E among the mounting holes 33-E to 35-E. The locking holes 48 are arranged at positions respectively displaced rightward as illustrated in FIG. 24 with respect to the first mounting hole 33-E and the second mounting hole 34-E or, in other words, a protruding direction of the extending portions 30b-E and 31b-E.

The lamp clip 18-E is mounted onto the chassis 14-E as described below. That is, when the lamp clip 18-E is pushed into the chassis 14-E in a state where all of the mounting portions 30-E to 32-E are conformed to the mounting holes 33-E to 35-E, the mounting portions 30-E to 32-E are inserted into the mounting holes 33-E to 35-E. When the lamp clip 18-E is slid in the protruding direction of the extending portions 30b-E to 32b-E from the state where the extending portions 30b-E to 32b-E are protruding to the rear side of the chassis 14-E, the extending portions 30b-E to 32b-E become arranged on a rear side of a front part in the direction of sliding due to mounting of a rim of the mounting holes 33-E to 35-E.

In this process, the extending portions 30b-E and 31b-E of the first mounting portion 30-E and the second mounting portion 31-E are elastically bent when the locking protrusions 46 are pressed against the rear surface of the chassis 14-E. When the lamp clip 18-E is slid to a defined position, the extending portions 30b-E and 31-E of the first mounting portion 30-E and the second mounting portion 31-E are restored. As a result, the locking protrusions 46 are fitted in the respective locking holes 48 and hooked to rims of the respective locking holes 48 with opposing surfaces thereof against the rims. Accordingly, inadvertent movement of the lamp clip 18-E in a detaching direction can be regulated. In this state, the rims of the mounting holes 33-E to 35-E are held between the extending portions 30b-E to 32b-E of the mounting portions 30-E to 32-E and the main body 27-E, and the mounting holes 33-E to 35-E are closed by the main body 27-E.

As described above, according the present embodiment, the main body 27-E is configured so as to have a rectangular shape and the sliding direction of the lamp clip 18-E is set along a long-side direction of the main body 27-E, wherein the mounting holes 33-E to 35-E are to be closed by a portion among the main body 27-E at which the lamp gripping portion 28-E is provided in a state where the lamp clip 18-E is mounted to the chassis 14-E. Such a configuration enables the mounting holes 33-E to 35-E to be closed by a portion among the main body 27-E at which the lamp gripping portion 28-E is provided when the lamp clip 18-E is slid along the long-side direction of the main body 27-E. Therefore, since a dedicated portion for closing the mounting holes 33-E to 35-E need not be provided on the main body 27-E, the configuration is suitable for downsizing the main body 27-E.

In addition, the extending portions 30b-E to 32b-E are formed in cantilevered shapes extending from the base portions 30a-E to 32a-E in a direction of sliding accompanying mounting of the lamp clip 18-E. Such a configuration enables the rim of the mounting holes 33-E to 35-E to be favorably held between the extending portions 30b-E to 32b-E forming cantilevered shapes and the main body 27-E.

Furthermore, locking holes 48 are provided on the chassis 14-E adjacent to the mounting holes 33-E and 34-E, and locking protrusions 46 that can be locked on the peripheral face of the locking holes 48 are provided on the tips of the cantilevered extending portions 30b and 31b. Such a configuration causes the locking protrusions 46 to be locked to the peripheral faces of the locking holes 48 and enables backward movements of the mounted lamp clip 18-E to be reliably restricted.

Seventh Embodiment

A seventh embodiment of the present invention will be described with reference to FIG. 25. In the present seventh embodiment, a configuration will be presented where structures of mounting portions 30-F to 32-F and mounting holes 33-F to 35-F have been further changed. Moreover, in the present seventh embodiment, parts with the same names as in the first embodiment described above will be denoted using the same reference characters and by adding a suffix -F, and redundant descriptions on structures, operations, and effects will be omitted.

Figure 25:
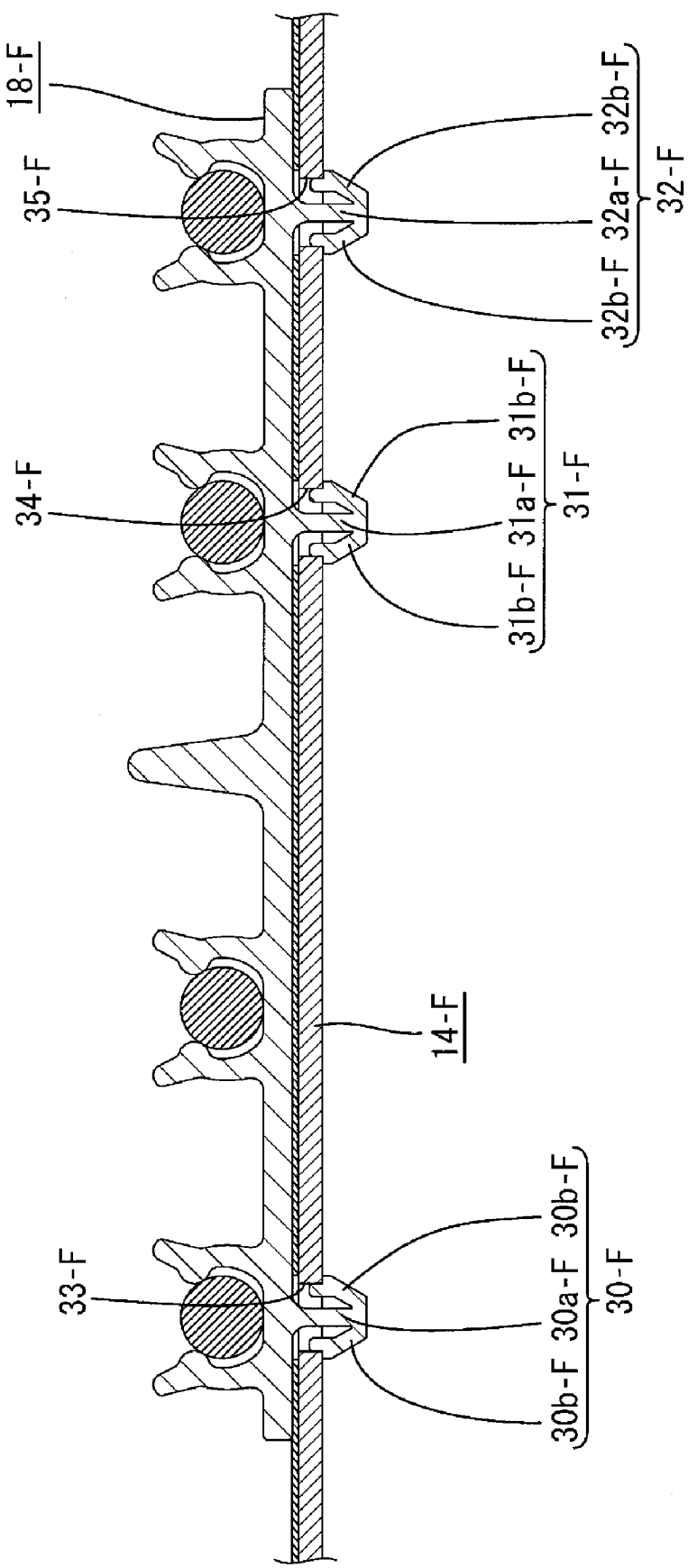
FIG. 25 is a cross-sectional view illustrating a lamp clip mounted to a chassis according to a seventh embodiment of the present invention.

As illustrated in FIG. 25, the mounting portions 30-F to 32-F include base portions 30a-F to 32a-F that protrude from a rear surface of a main body 27-F and pairs of extending portions 30b-F to 32b-F folded back toward the main body 27-F from distal ends of the respective base portions 30a-F to 32a-F so as to face the base portions 30a-F to 32a-F. The extending portions 30b-F to 32b-F has a cantilevered shape and is elastically deformable so as to approach the side of the base portions 30a-F to 32a-F. Stepped locking faces are formed on distal ends of the extending portions 30b-F to 32b-F. The mounting holes 33-F to 35-F of the chassis 14-F are configured so as to have diameter sizes approximately equal to the intervals between locking faces of both extending portions 30b-F to 32b-F.

When a lamp clip 18-F is pushed against a chassis 14-F from a front side along the Z-axis direction, the mounting portions 30-F to 32-F are inserted into the mounting holes 33-F to 35-F and the extending portions 30b-F to 32b-F are temporarily elastically deformed. When the lamp clip 18-F is pushed to a normal depth, the mounting portions 30-F to 32-F protrude to a rear side of the chassis 14-F, the extending portions 30b-F to 32b-F are restored, and the locking faces are locked from the rear side by rims of the mounting holes 33-F to 35-F of the chassis 14-F. Accordingly, the lamp clip 18-F is held in a mounted state with respect to the chassis 14-F.

As described above, according to the present embodiment, the mounting portions 30-F to 32-F include base portions 30a-F to 32a-F protruding from the main body 27-F to the side of the chassis 14-F and extending portions 30b-F to 32b-F protruding from the base portions 30a-F to 32a-F in a direction along the main body 27-F, whereby the extending portions 30b-F to 32b-F are configured so as to hold rims of the mounting holes 33-F to 35-F between the main body 27-F when inserted into the mounting holes 33-F to 35-F. Such a configuration causes the lamp clip 18-F to become suitable for pushing the lamp clip 18-F against the chassis 14-F.

In addition, the extending portions 30b-F to 32b-F extend from tips of the base portions 30a-F to 32a-F to the side of the main body 27-F and are formed in an elastically deformable cantilevered shape arranged so as to oppose each other at positions separated by a predetermined interval from the base portions 30a-F to 32a-F. Such a configuration enables the extending portions 30b-F to 32b-F to be elastically deformable during the process of being inserted into the mounting holes 33-F to 35-F and can reduce a force required to push the lamp clip 18-F.

Other Embodiments

The present invention is not limited to the embodiments disclosed by the above description and accompanying drawings and, for example, the embodiments described below also fall within the technical scope of the present invention.

(1) In addition to the embodiments described above, arrangements of the mounting portions and mounting holes can be appropriately modified, specific examples of which are shown in (2) to (4) below.

(2) While cases where a distance from a first mounting portion to a center of a main body and a distance from a third mounting portion to the center of the main body are set approximately equal have been described in the first to third embodiments above, a configuration where the mounting portions are arranged such that the distance from the first mounting portion to the center of the main body and the distance from the third mounting portion to the center of the main body differ from each other is to be also included in the present invention.

(3) While a case where a mounting portion (second mounting portion) arranged concentrically to a center of a main body is included in nonlinearly arranged mounting portions has been described in the fourth embodiment above, a configuration where all of the nonlinearly arranged mounting portions are arranged at positions offset from the center of the main body is to be also included in the present invention. In addition, allocation positions of the mounting holes can be changed to positions corresponding to the mounting portions.

(4) While a case where distances with different sizes exist among distances between nonlinearly arranged mounting portions has been described in the fourth embodiment above, a configuration where all of the distances between nonlinearly arranged mounting portions are arranged so as to be equal is also included in the present invention. In addition, allocation positions of the mounting holes can be changed to positions corresponding to the mounting portions.

(5) In addition to the embodiments described above, the numbers and shapes of the mounting portions and mounting holes can be appropriately modified, specific examples of which are shown in (6) to (8) below.

(6) Configurations where four or more mounting portions and mounting holes are respectively arranged are to be also included in the present invention.

(7) When four or more mounting portions are to be installed in a linear arrangement, while the sizes of all distances between the mounting portions may be arranged so as to differ from each other, the mounting portions may also be arranged so that a plurality of distances of the same size exists. In addition, allocation positions of the mounting holes can be changed to positions corresponding to the mounting portions.

(8) While cases where a protrusion among a mounting portion is circularly formed as seen in plan view have been described in the first to fifth embodiments above, configurations where the protrusion is formed in a polygon such as a quadrangle or an ellipse are to be also included in the present invention. In addition, the shape of a base portion among the mounting portion can similarly be modified. When the shape of the mounting portion is changed in this manner, a corresponding change can be made to the shape of the mounting hole.

(9) While operations and effects due to a lamp clip being mounted in a predetermined state with respect to a rotational direction around a midpoint have been primarily described in the embodiments above, for example, even in a case where the mounting portions are displaced with respect to the mounting holes in a direction perpendicular to a protruding direction of the mounting portions even when the lamp clip is in a same state as the first state with respect to the rotational direction, any one of the mounting portions becomes inconsistent with a mounting hole. As a result, mounting can be reliably regulated even in such a state. In addition, for example, even in a state where a lamp clip has been rotated 90 degrees from a normal state, any one of the mounting portions becomes inconsistent with a mounting hole and mounting can be reliably regulated.

(10) In addition to the embodiments described above, the number, shape, arrangement, and the like of supporting pins of a lamp clip can be appropriately modified. Specifically, a plurality of supporting pins may be arranged. Furthermore, a supporting pin may be formed in a pyramid shape. Moreover, a supporting pin may be installed at an eccentric position with respect to a width direction of a main body.

(11) In addition to the embodiments described above, the shape of a main body of a lamp clip may be appropriately modified. Specifically, configurations where a main body is shaped in a square in plan view, a circle, an ellipse, and a polygon other than a quadrature in plan view are to be also included in the present invention.

(12) While cases where a cold cathode tube is used as a light source have been described in the embodiments above, cases using other light sources such as a hot cathode tube are to be also included in the present invention.

(13) While a chassis made of sheet metal has been used in the embodiments described above, a chassis may alternatively be made by resin molding.

(14) While an illumination device including a cold cathode tube has been described in the above embodiments, the present invention can also be applied to a chassis assembly not mounted with a cold cathode tube and assembles a lamp clip onto a chassis. In such a case, a configuration not mounted with a reflection sheet and/or an optical member may be adopted.

(15) While a TFT has been used as a switching element of a liquid crystal display device in the embodiments described above, the present invention can also be applied to a liquid crystal display device using a switching element other than a TFT (for example, a thin film diode (TFD)) or to a black-and-white liquid crystal display device in addition to a color liquid crystal display device.

(16) While a liquid crystal display device using a liquid crystal panel has been exemplified as a display panel in the embodiments described above, the present invention can also be applied to a display device using another display panel type.

(17) While a television receiver apparatus including a tuner has been exemplified in the embodiments described above, the present invention can also be applied to a display device not including a tuner.

What is claimed is:

1. A chassis assembly comprising:
a chassis including at least two mounting holes; and
a lamp holder including:
a main body having shorter sides and longer sides and arranged to be mounted to the chassis;
at least one lamp gripping portion provided on the main body and arranged to grip a lamp;
at least two mounting portions protruding from the main body so as to extend toward the chassis side to be inserted in a corresponding one of the at least two mounting holes such that a rim of the respective mounting hole is sandwiched between the corresponding mounting portion and the main body; wherein
each of the at least two mounting portions is arranged asymmetrically with respect to a midpoint of the shorter sides of the main body.

2. The chassis assembly according to claim 1, wherein centers of the at least two mounting portions are arranged along an imaginary straight line that is asymmetrical relative to the midpoint of the shorter sides of the main body.

3. The chassis assembly according to claim 1, wherein the main body includes first and second projecting portions provided for each of the at least two mounting portions, the first and second projecting portions extending oppositely in the direction of the shorter sides of the main body, and each of the at least two mounting portions is located closer to a respective end of one of the first and second projecting portions than a respective end of the other of the first and second projecting portions.

4. The chassis assembly according to claim 3, wherein the at least two mounting portions are provided on the respective one of the first and second projecting portions that is located closer to the at least two mounting portions.

5. The chassis assembly according to claim 3, wherein the other of the first and second projecting portions are arranged to cover the at least two mounting holes of the chassis.

6. The chassis assembly according to claim 1, wherein the at least one lamp gripping portion comprises at least two lamp gripping portions disposed on opposite ends of the main body.

7. The chassis assembly according to claim 6, wherein the at least two lamp gripping portions comprise an even number of lamp gripping portions.

8. The chassis assembly according to claim 1, wherein at least one of the at least two mounting portions is arranged asymmetrically with respect to a midpoint of the longer sides of the main body.

9. The chassis assembly according to claim 1, wherein the at least two mounting portions comprise an odd number of mounting portions.

10. The chassis assembly according to claim 9, wherein the at least two mounting portions comprise three mounting portions.

11. The chassis assembly according to claim 10, wherein each of the three mounting portions is arranged asymmetrically with respect to a midpoint of the shorter sides of the main body.

12. The chassis assembly according to claim 10, wherein at least one of the three mounting portions is arranged asymmetrically with respect to a midpoint of the longer sides of the main body.

13. The chassis assembly according to claim 10, wherein centers of at least two of the three mounting portions are arranged along an imaginary straight line and a center of a remaining one of the three mounting portions is not arranged along the imaginary straight line.

14. The chassis assembly according to claim 1, wherein the at least two mounting holes include a wide portion and a narrow portion, the at least two mounting portions are inserted in the corresponding wide portion of a respective one of the at least two mounting holes and are slid to the corresponding narrow portion.

15. The chassis assembly according to claim 1, wherein a direction in which the shorter sides of the main body extend matches a sliding direction in which the lamp holder slides relative to the chassis so as to cover the at least two mounting holes.

16. An illumination device comprising:
the chassis assembly according to claim 1;
a lamp housed in the chassis; and
an optical member arranged such that the lamp is located between the chassis and the optical member.

17. A display device comprising:
the illumination device according to claim 16; and
a display panel arranged in front of the illumination device.

18. The display device according to claim 17, wherein the display panel is a liquid crystal panel constructed such that a liquid crystal is sealed between a pair of substrates.

19. A television receiver apparatus comprising the display device according to claim 17.

* * * * *